(12) United States Patent
Peters

(10) Patent No.: US 7,866,422 B2
(45) Date of Patent: Jan. 11, 2011

(54) ELECTRIC GOLF CART AND UTILITY CART

(75) Inventor: William F. Peters, Friendswood, TX (US)

(73) Assignee: Charles E. Wilson, League City, TX (US)

( * ) Notice: Subject to any disclaimer, the term of this patent is extended or adjusted under 35 U.S.C. 154(b) by 547 days.

(21) Appl. No.: 11/124,967

(22) Filed: May 9, 2005

(65) Prior Publication Data

US 2005/0279541 A1    Dec. 22, 2005

Related U.S. Application Data

(60) Provisional application No. 60/569,387, filed on May 7, 2004.

(51) Int. Cl.
*B60K 1/00* (2006.01)

(52) U.S. Cl. ............... 180/65.1; 180/65.6; 296/190.04

(58) Field of Classification Search .............. 180/65.1, 180/6.5, 907, 65.5, 6.48, 60, 214, 65.6, 311, 180/312; 301/63 PW; 296/77.1, 102, 79, 296/148, 190.04; 280/786
See application file for complete search history.

(56) References Cited

U.S. PATENT DOCUMENTS

| | | | | |
|---|---|---|---|---|
| 2,245,789 A * | 6/1941 | Klavik | ............ | 280/786 |
| 2,822,969 A * | 2/1958 | Cooper | ............ | 224/42.32 |
| 3,163,250 A * | 12/1964 | Gibson | ............ | 180/253 |
| 3,843,202 A * | 10/1974 | Lacerte | ............ | 301/64.701 |
| 4,105,084 A * | 8/1978 | Baak | ............ | 180/11 |
| 4,842,326 A * | 6/1989 | DiVito | ............ | 296/193.04 |
| 5,004,061 A | 4/1991 | Andruet | | |
| 5,087,229 A | 2/1992 | Hewko et al. | | |
| 5,203,601 A * | 4/1993 | Guillot | ............ | 296/77.1 |
| 5,272,938 A * | 12/1993 | Hsu et al. | ............ | 74/594.1 |
| D350,505 S | 9/1994 | Yang | | |
| 5,402,046 A * | 3/1995 | Jeanneret | ............ | 318/139 |
| 5,481,460 A * | 1/1996 | Masaki et al. | ............ | 701/50 |
| D390,163 S | 2/1998 | Tomforde et al. | | |
| D391,899 S | 3/1998 | Chibuka et al. | | |
| 5,727,642 A * | 3/1998 | Abbott | ............ | 180/65.1 |
| D404,690 S | 1/1999 | Garand et al. | | |
| 5,894,902 A * | 4/1999 | Cho | ............ | 180/65.5 |
| 6,065,798 A * | 5/2000 | Sankrithi | ............ | 296/183.1 |
| 6,100,615 A * | 8/2000 | Birkestrand | ............ | 310/75 C |
| D432,460 S | 10/2000 | Huang | | |
| 6,145,913 A * | 11/2000 | Odagaki | ............ | 296/65.11 |
| 6,199,651 B1 | 3/2001 | Gay | | |
| D441,320 S | 5/2001 | Kehr | | |
| D442,517 S | 5/2001 | Hoogenraad | | |
| 6,390,216 B1 | 5/2002 | Sueshige et al. | | |
| 6,397,961 B1 * | 6/2002 | Sutton | ............ | 180/65.1 |

(Continued)

*Primary Examiner*—J Allen Shriver, II
*Assistant Examiner*—John D Walters
(74) *Attorney, Agent, or Firm*—Locke, Lord, Bissell & Liddell LLP

(57) ABSTRACT

A four-wheel electric vehicle includes wheels having electric hub or geared, series wound induction drive motors mounted on one or more wheels. The vehicle requires no outside power transmission devices, such as differential gears or drive axles, to rotate the wheels. The vehicle includes a vehicle body adapted to accommodate seating for at least one adult person. The vehicle body is composed of several modular panels that may be releasably attached to one another to configure the vehicle for multiple applications. In one embodiment, the vehicle is a golf cart. In another embodiment, the vehicle is a multipurpose utility cart.

51 Claims, 32 Drawing Sheets

U.S. PATENT DOCUMENTS

| | | |
|---|---|---|
| 6,494,278 B1 | 12/2002 | Weisz |
| 6,494,531 B1 * | 12/2002 | Kim .......................... 297/94 |
| 6,547,304 B1 * | 4/2003 | Conner et al. ................. 296/79 |
| 6,564,802 B1 * | 5/2003 | Kraeft, Sr. ................. 128/845 |
| 6,776,445 B1 * | 8/2004 | Conner et al. ................. 296/79 |
| 7,100,722 B2 * | 9/2006 | Bowen ...................... 180/65.5 |
| 7,163,072 B2 * | 1/2007 | Yamaguchi ................ 180/65.2 |
| 7,192,040 B2 * | 3/2007 | Xie ....................... 280/93.502 |
| 7,195,096 B1 * | 3/2007 | Mawhinney ................ 180/315 |
| 7,258,395 B2 * | 8/2007 | Bataille et al. ......... 296/203.01 |
| 7,373,315 B2 * | 5/2008 | Chernoff et al. .............. 705/26 |
| 2003/0085064 A1 | 5/2003 | Turner |
| 2003/0085065 A1 | 5/2003 | Weisz |
| 2003/0230443 A1 * | 12/2003 | Cramer et al. ............. 180/65.5 |
| 2004/0112656 A1 * | 6/2004 | Bowen ...................... 180/65.5 |
| 2008/0017426 A1 * | 1/2008 | Walters et al. ............. 180/65.2 |

* cited by examiner

ELECTRIC GOLF CART AND UTILITY CART

CROSS-REFERENCE TO RELATED APPLICATION

This application for patent claims priority to U.S. Provisional Application Ser. No. 60/569,387, entitled "Electric Golf Cart and Utility Cart," filed on May 7, 2004, and hereby incorporated by reference.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

This invention is related to four-wheel vehicles and more particularly to a four-wheel vehicle adaptable to personal and commercial usage and powered by electric hub motors or geared, electric induction motors driving either one or two rear wheels.

BACKGROUND OF THE INVENTION

Many electric four-wheel vehicles exist for transportation of people or goods, as well as for recreational use. Electric vehicles designed for use in the sport of golf are the most common of these vehicles, although electric adaptive vehicles for physically challenged persons are also popular.

Electric four-wheel vehicles typically use series wound, separately excited DC induction motors that turn ring and planetary differential gears. The ring and planetary differential gears, in turn, rotate drive axles that are connected to pneumatic tire wheels to propel the vehicles. Although these vehicles are designed to transport people, some goods can also be transported.

Electric four-wheel vehicles typically use a two-wheel, spring-based transverse beam for the front suspension, and low-pressure high flotation pneumatic tires. Braking is mechanically activated using drum type friction brakes on the rear wheels. Positive override parking brakes are usually an integral part of the mechanical brake system.

A constant 24/36/48 volts is provided to the DC motors from storage batteries with the electrical current input controlled by fixed amperage controllers. The storage batteries are recharged by separate 110 or 220 volt chargers. A potentiometer provides varying amounts of current to the motors to throttle the vehicles.

The existing electric vehicles described above, however, are complicated contraptions. Thus, there is a continuing need to simplify the complicated drive and braking systems of existing electric four-wheel vehicles to make them mechanically stronger and reduce unnecessary maintenance.

SUMMARY OF THE INVENTION

The present invention is directed to a vehicle that requires no outside power transmission devices such as differential gears or drive axles to turn the wheels. The vehicle of the invention is an electric, wheel-driven vehicle that simplifies and strengthens the drive system by reducing the number of components, thereby reducing the maintenance requirements. Vehicle ride comfort is enhanced and operating stresses reduced by virtue of lower vehicle weight and an improved suspension system. In addition, the electric vehicle of the invention replaces the traditional pneumatic rubber tires with improved foam tires to reduce tire maintenance and provide greater load carrying capacity for the vehicle. Furthermore, in some embodiments, the electric vehicle of the invention includes a hybrid charging system that supplements the traditional electrical charging system. Also present are controllers that allow for more precisely managed electric current output to the drive motor or motors.

In general, in one aspect, the invention is directed to a battery powered golf cart. The golf cart comprises a substantially rectangular frame, a golf cart body mounted to the frame, and a pair of front and rear wheels coupled to the frame. A steering assembly is connected to the front wheels for steering the golf cart and a battery operated hub motor is mounted on at least one of the wheels and configured to directly drive the wheel. A current regulator is electrically connected to the hub motor for limiting an amount of electric current to the motor.

In general, in another aspect, the invention is directed to a battery powered four-wheeled vehicle. The vehicle comprises a substantially rectangular frame, a vehicle body mounted to the frame, and a pair of front and rear wheels coupled to the frame. The vehicle further comprises a steering assembly connected to the front wheels for steering the vehicle and a battery operated hub motor mounted on at least one of the rear wheels and configured to directly drive the wheel. A current regulator is electrically connected to the hub motor for limiting an amount of electric current to the motor, wherein the vehicle requires no outside power transmission devices, including differential gears or drive axles, to turn the wheels.

In general, in yet another aspect, the invention is directed to a battery powered four-wheel vehicle. The vehicle comprises a substantially rectangular frame having transverse and longitudinal frame members, a vehicle body mounted on the frame, the vehicle body adapted to accommodate seating for at least one adult person, and a pair of front and rear wheels, each wheel coupled to the frame by an articulated and independently suspended coupling member. The vehicle further comprises a steering assembly connected to the front wheels for steering the vehicle and a battery operated induction motor mounted on at least one of the rear wheels. The battery operated induction motor is configured to directly drive the wheel and is capable of being interchangeably mounted on either one of the rear wheels without modification to the motor or the wheels. A current regulator is electrically connected to the motor for limiting an amount of electric current to the motor to vary the speed of the vehicle.

Other advantages and features of the invention will become apparent from the following descriptions, the drawings, and the claims.

BRIEF DESCRIPTION OF THE DRAWINGS

The foregoing and other advantages of the invention will become apparent from the following detailed description and upon reference to the drawings, wherein.

DESCRIPTION OF ILLUSTRATIVE EMBODIMENTS

Figure 1:
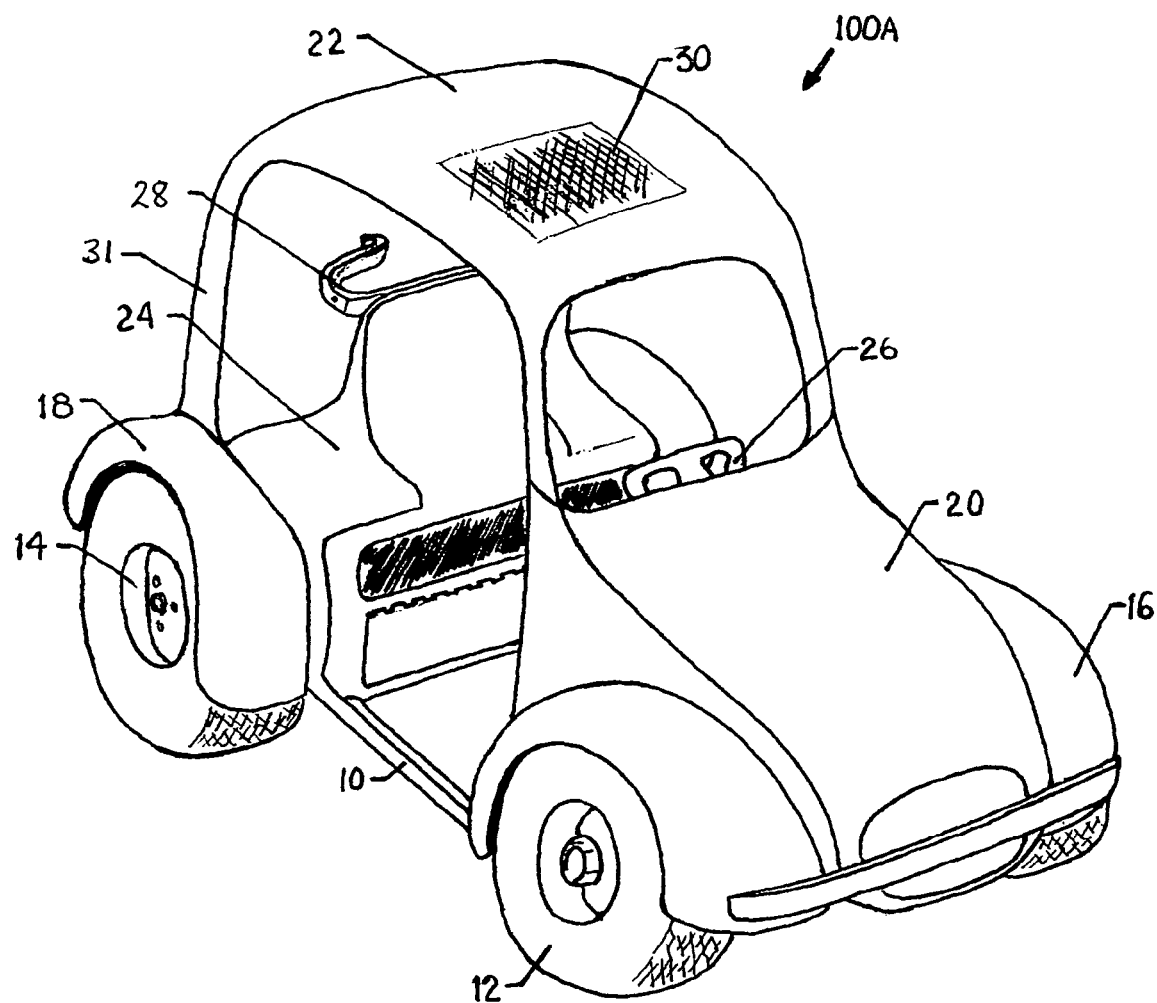
FIG. 1 is a perspective view of an exemplary four-wheel electric wheel-driven vehicle according to one embodiment.

Following is a detailed description of illustrative embodiments of the invention with reference to the drawings wherein the same reference labels are used for the same or similar elements.

In accordance with the embodiments described herein, a four-wheel electric wheel-driven vehicle is disclosed for transportation of people or goods, as well as for recreational uses. Although a four-wheel vehicle is described herein, a person having ordinary skill in the art will recognize that the principles and teachings of the present invention may be equally applicable to vehicles with fewer or more than four-wheels. The four-wheel electric vehicle has a hub motor mounted in at least one and possibly more rear wheels, depending on the amount of power desired for the vehicle. It is also possible to mount a hub motor in one or more of the front wheels. The hub motors may be any suitable electric hub motors, but are preferably DC wound induction motors with gears attached for directly driving the rear wheels. Similarly, the front and rear wheels are preferably articulated and independently suspended on a vehicle frame. The suspension system for the wheels includes, in some embodiments, independently suspended "A" members coupled to gas canister shock absorbers, although other types of suspension systems may certainly be used.

A steering assembly is connected to the front wheels and allows the vehicle to be steered. The steering assembly may comprise, for example, a pivotal spindle coupled to the independently suspended "A" members and a transverse rack and pinion steering member coupled to the pivotal spindles. A longitudinal pivotal steering column is coupled to the rack and pinion steering member on one end and a steering wheel on the other end and slopes upward from the front to the rear of the vehicle. In some embodiments, the longitudinal steering column may be aligned directly behind the center coupling on the rack and pinion steering member. In other embodiments, the longitudinal steering column may be aligned about ten degrees to the left of the center coupling on the rack and pinion steering member.

As for the vehicle frame, this part of the vehicle may comprise a substantially rectangular chassis with several transverse frame support members coupled thereto. The transverse frame support members connect the long sides of the substantially rectangular chassis together. One transverse frame support member may be located near the front of the substantially rectangular chassis, and two transverse frame support members may be located near the rear of the chassis. A pair of longitudinal frame support members connect the two rear transverse frame support members. Mounting brackets may then be connected to the vehicle frame for mounting the suspension system of the wheels. In some embodiments, the mounting brackets may be designed specifically to support the independently suspended "A" members of the suspension system. Corner support tabs and body mounting tabs (an example of which is shown at 11 in FIG. 19) may also be attached to the vehicle frame. The tabs may be made of a suitable fiberglass reinforced rigid polymer, a polycarbonate resin, a structural composite or other suitable material.

The four-wheel electric vehicle, in some embodiments, may also include a brake system. Any suitable brake system may be used, but in some embodiments, the brake system is preferably a mechanical brake system that is operatively coupled to a foot-activated pedal mounted on one of the rear transverse frame support members. The mechanical brake system may comprise a longitudinal connecting rod coupled to an external rotating disk braking mechanism that is connected to the electric hub motor casing. In some embodiments, the mechanical braking system may have locking capability, such as an over-the-center coil spring tensioned pivoting locking bar coupled to the brake system foot pedal.

As mentioned above, in some embodiments, the four-wheel electric vehicle may be powered by one or more DC induction hub motors. Such DC induction hub motors may have brushes or they may be brushless, and they may have gears or they may be gearless. In other embodiments, the hub motors may instead be axial air gap induction hub motors that are preferably used in conjunction with molded urethane tires. Other types of electric hub motors may also be used without departing from the scope of the invention.

Current is supplied to the one or more motors by one or more batteries. Examples of suitable batteries may include 24/36/48 volt lead-acid, nickel-cadmium, or nickel-metal hydride batteries. The current from the batteries may be controlled through, for example, a variable current controller. The variable current controller may be part of the throttle assembly and may be, for example, a 40-100 amps variable current controller. Electric current to the hub motor is preferably regulated by the throttle assembly. The throttle assembly may also include, for example, a hand or foot actuated potentiometer ergonomically located on the vehicle for rider comfort. The current to the hub motors may be interrupted using, for example, a keyed switch or other suitable mechanisms.

A hybrid recharging system maintains the lead-acid, nickel-cadmium or nickel-metal hydride batteries in a substantially charged state. The hybrid recharging system may include, for example, 110 or 220 volt transformer type chargers and photovoltaic array battery chargers. Such a hybrid recharging system helps expedite recharging of the batteries in a more efficient and cost effective manner compared to existing electric vehicle battery recharging systems. Battery power status is continuously indicated to the rider by, for example, an appropriate display gauge such as a liquid crystal display gauge.

The four-wheel electric vehicle may also include a vehicle body constructed of one of the well-known rigid structural polymers such as a molded fiberglass reinforced polymer. Of course, other materials, such as, for example, polycarbonates, polyesters and structural composites, may also be used. The vehicle body may have a number of sections, including a center hood section, a rider seat section, a battery compartment and storage area section, and a pair of rear fenders with a storage bed section. The sections may in the form of releasably attached panels that are swapped in and out in order to configure the vehicle for a specific use. Any suitable type of seat may be mounted in the rider seat section, such as a polyvinyl molded foam seat. In some cases, the seat may include a safety belt and may be swiveled for ease of entry and egress. If doors and corresponding hinges are on the vehicle, they may be mounted on the vehicle body in the usual manner. For example, the doors may be coupled to the battery compartment and storage area section. A golf bag restraint and support system may be coupled to the rear storage bed section.

In some embodiments, the vehicle body also comprises a firewall and dashboard section and a roof section. Additionally, two seats instead of one may be coupled to the rider and passenger seat section, and/or two golf bag restraint and support systems may be coupled to the rear fender storage bed section. In some embodiments, the vehicle body further comprises a center tool box configuration section and a rear tool box configuration in the storage bed section. In some embodiments, the vehicle body further comprises a center molded golf bag restraint and storage section.

A rider operates the vehicle while seated in the semi-enclosed vehicle body. The rider controls the travel speed of the vehicle through application of the throttle assembly to control the power supply current distribution controller and thereby control the electric motor. The rider slows, stops and locks the vehicle via the mechanical braking system by applying direct, unassisted force to a pedal assembly of the braking system. The force is transmitted from the pedal assembly through a transmission cable to a caliper friction disc located externally on the wheel to thereby slow, stop, or lock the wheel. The vehicle is steered by the rider via the steering assembly, which may include the steering wheel coupled to a steering transmission bar, coupled to the rack and pinion steering member, coupled to one or more tie rods that are coupled to the pivotal spindles. The drive direction of the one or more hub motors may be reversed so as to drive the vehicle in the opposite direction. Reversing the hub motors may be controlled by a reverse polarity switch. An audible alarm may be used to warn bystanders when the vehicle is traveling in reverse.

An exemplary embodiment of the invention is shown in FIG. 1. As can be seen, a four-wheel electric wheel-driven vehicle 100A comprises a frame 10, a pair of front wheels 12, a pair of rear wheels with motor mount bracket 14, a pair of front fenders 16, a pair of rear fenders 18, a nose section with crash bumper 20, a roof section 22, and a seat section 24. The seat section 24 defines an area where a separate seat may be mounted and includes an accessory storage and battery storage area underneath the seat mounting area. Also present is center-mounted steering wheel 26 (which may be foam-padded) and a golf bag retaining device 28. In some embodiments, a photovoltaic array battery charger 30 may be mounted on the roof section 22 for expediting charging of the batteries. In some embodiments, the steering wheel 26 attached to the steering transmission rod 46 (see FIG. 19) may be swiveled at an angle of about ten degrees left of center from the rack and pinion steering assembly 45 (see FIG. 19) in order to accommodate one- versus two-seat arrangements.

At least one of the rear wheels has an electric hub motor or geared induction motor (not shown here) mounted thereon. Such an electric hub motor may be any suitable, commercially available electric hub motor. The electric hub motor or geared induction motor is mounted to the wheel via the mount bracket 14. Electric current is supplied to the motors by a power cable, such as a split power cable 56 (see FIG. 19). The photovoltaic array battery charger 30, where present, supplies reverse electric current through switches, such as silicon photodiodes, to the PN junction of the 24/36/48 volt batteries by another power cable routed through either of the rear roof support posts 31. Battery condition is displayed by the battery discharge indicator located on the dashboard (not visible here). Braking is controlled by application of the brake pedal assembly 55 (see FIG. 19). Wire cables 54 transfer the force from the pedal assembly 55 to the pair of rear friction disc brake assembly 53.

Figure 2:
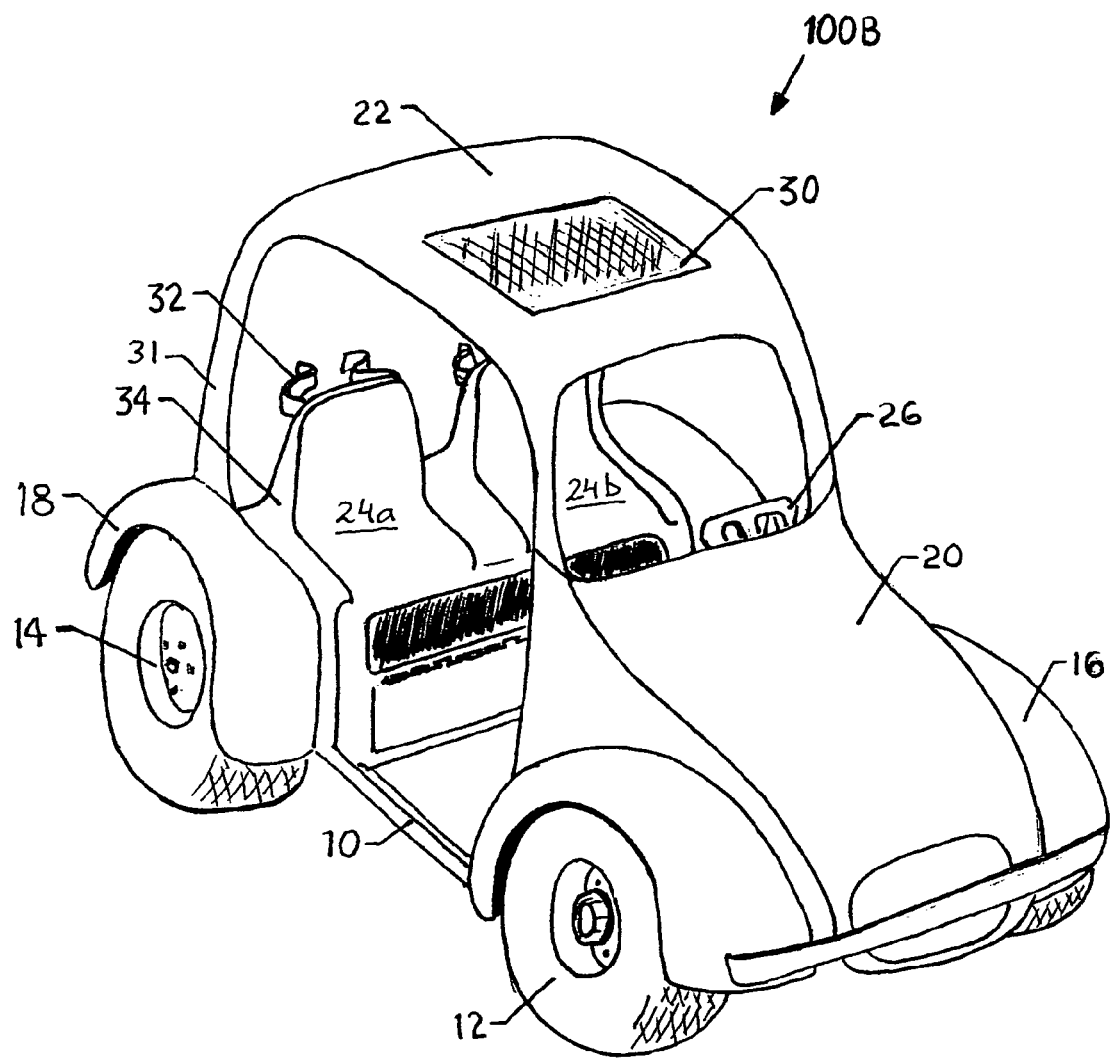
FIG. 2 is a perspective view of an exemplary four-wheel electric wheel-driven vehicle according to a second embodiment.

In another exemplary four-wheel electric wheel-driven vehicle 100B shown in FIG. 2, two seat areas 24*a* and 24*b*, preferably one for the driver and one for the passenger, are defined by the seat section 34, along with an accessory storage and battery storage section underneath (not visible here). The seats may be in the form of modular sections that may be releasably attached to the electric wheel-driven vehicle 100B, although it is also possible to have seats that are molded as part of the rest of the vehicle body. Attached to the rider and passenger seat accessory storage and battery storage section 34 are a pair of golf bag retaining devices 32, one on each side.

Figure 3:
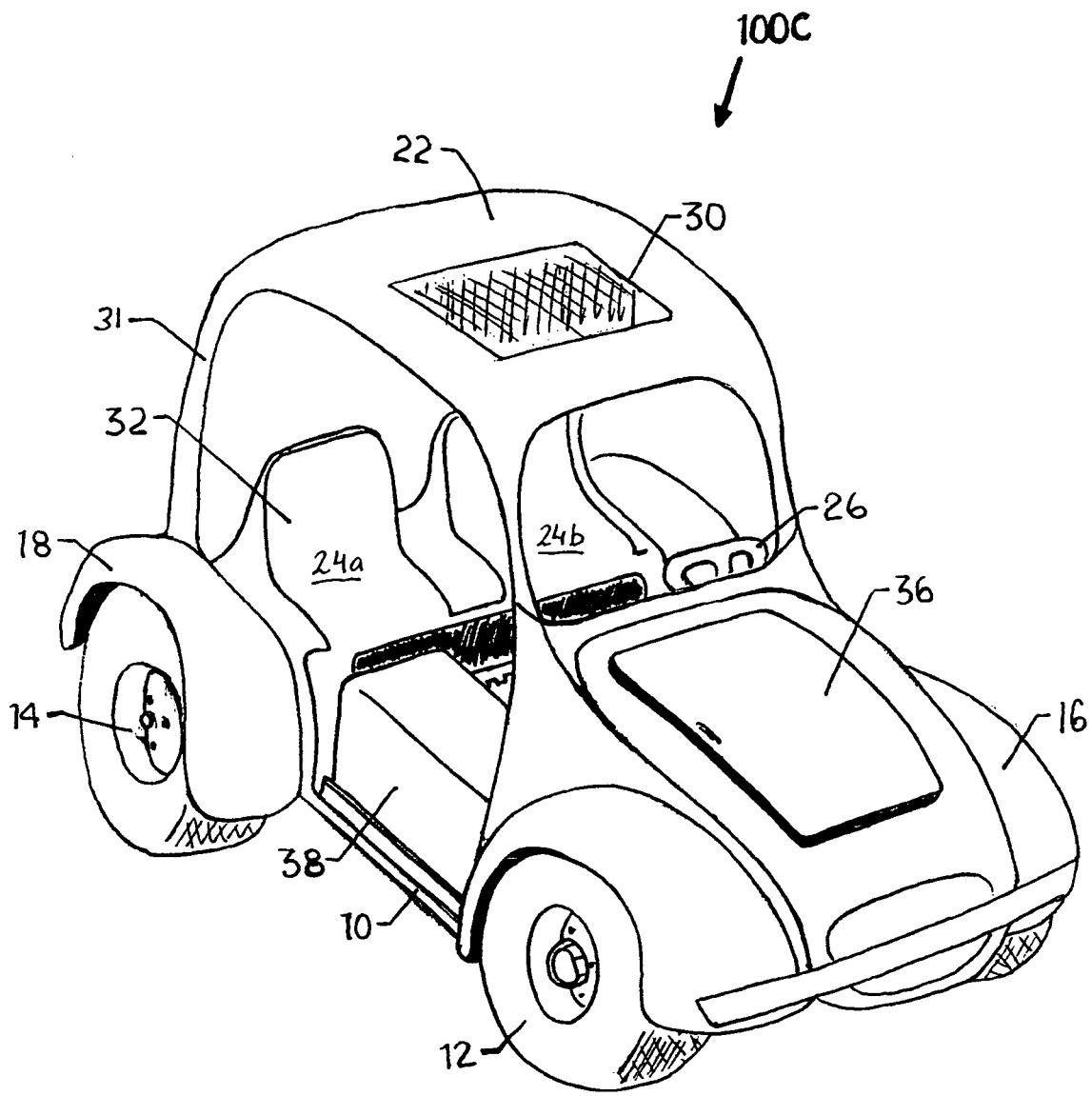
FIG. 3 is a perspective view of an exemplary four-wheel electric wheel-driven vehicle according to a third embodiment.

In yet another exemplary four-wheel electric wheel-driven vehicle 100C shown in FIG. 3, the nose section has an integrated storage area 36 that includes a hinged and latched cover. This embodiment also includes a removable storage container 38.

Figure 4:
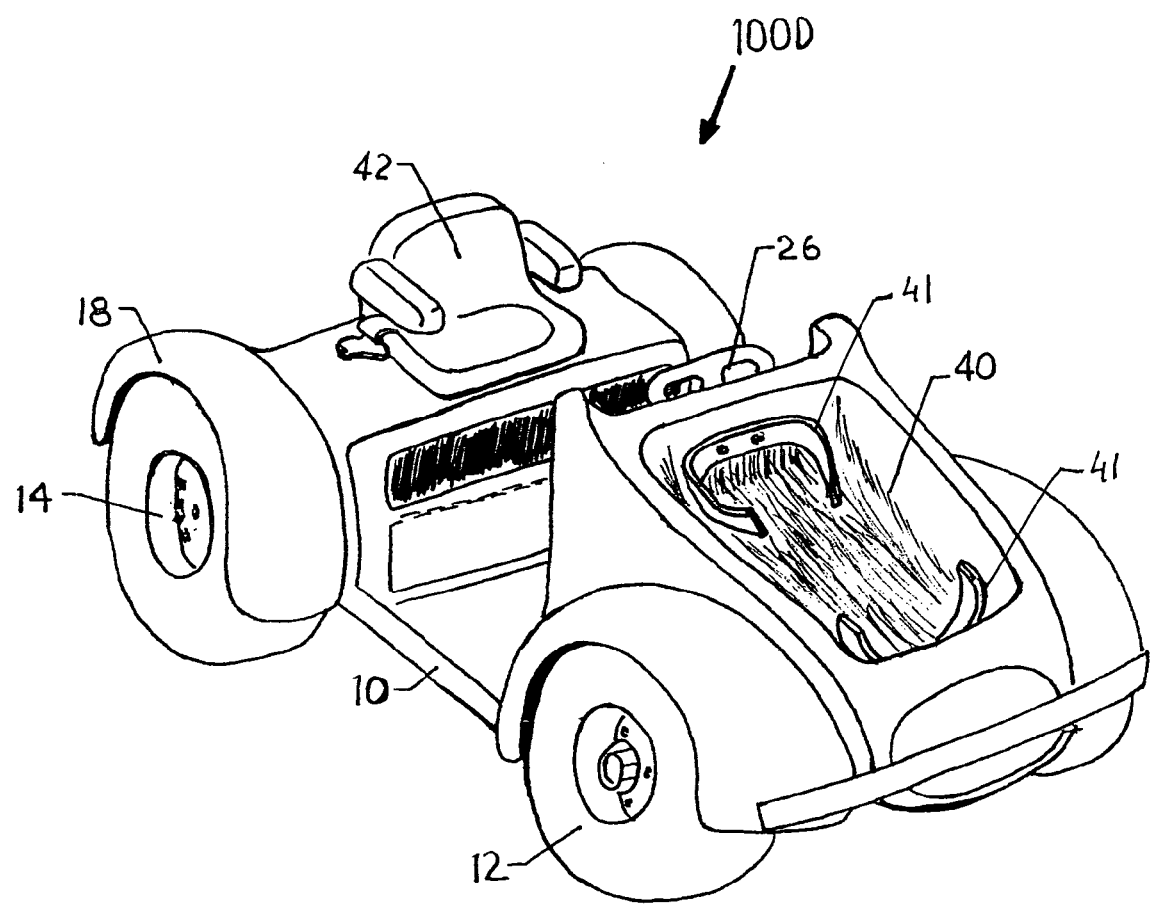
FIG. 4 is a perspective view of an exemplary four-wheel electric wheel-driven vehicle according to a fourth embodiment.

In still another exemplary four-wheel electric wheel-driven vehicle 100D shown in FIG. 4, the nose section has a golf bag storage section 40 with attached golf bag retaining device 41. The rider seat/accessory storage and battery storage section 32 are also replaced by a swiveled rider seat 42 with arm rests and a safety belt. The roof section 22 is removed to accommodate the rider turning to face the rear of the vehicle while seated. The golf bag platform (not visible) is also removed to allow the rider to place his/her feet directly on the ground to the rear of the vehicle for stabilization.

Figure 5:
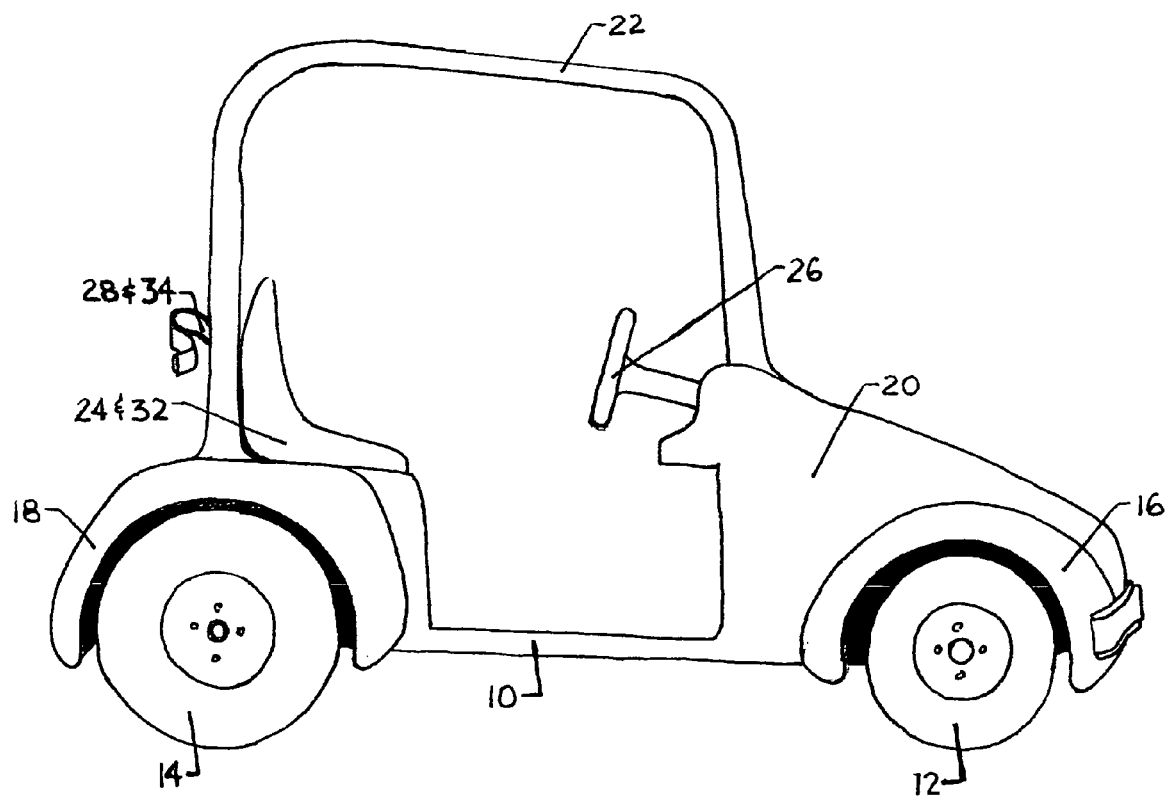
FIG. 5 is a side elevation view of the four-wheel electric wheel-driven vehicle of FIG. 1 and FIG. 2 with the rear wheels on the left and the front wheels on the right.

FIG. 5 shows a side elevation view of FIGS. 1, 2 respectively of the exemplary four-wheel electric wheel-driven vehicles 100A and 100B. Each wheel as shown is mounted on either the front spindle assembly 47 (see, e.g., FIG. 19) or the rear hub motor (or geared induction motor) mounting bracket 57 (see FIG. 23A).

Figure 6:
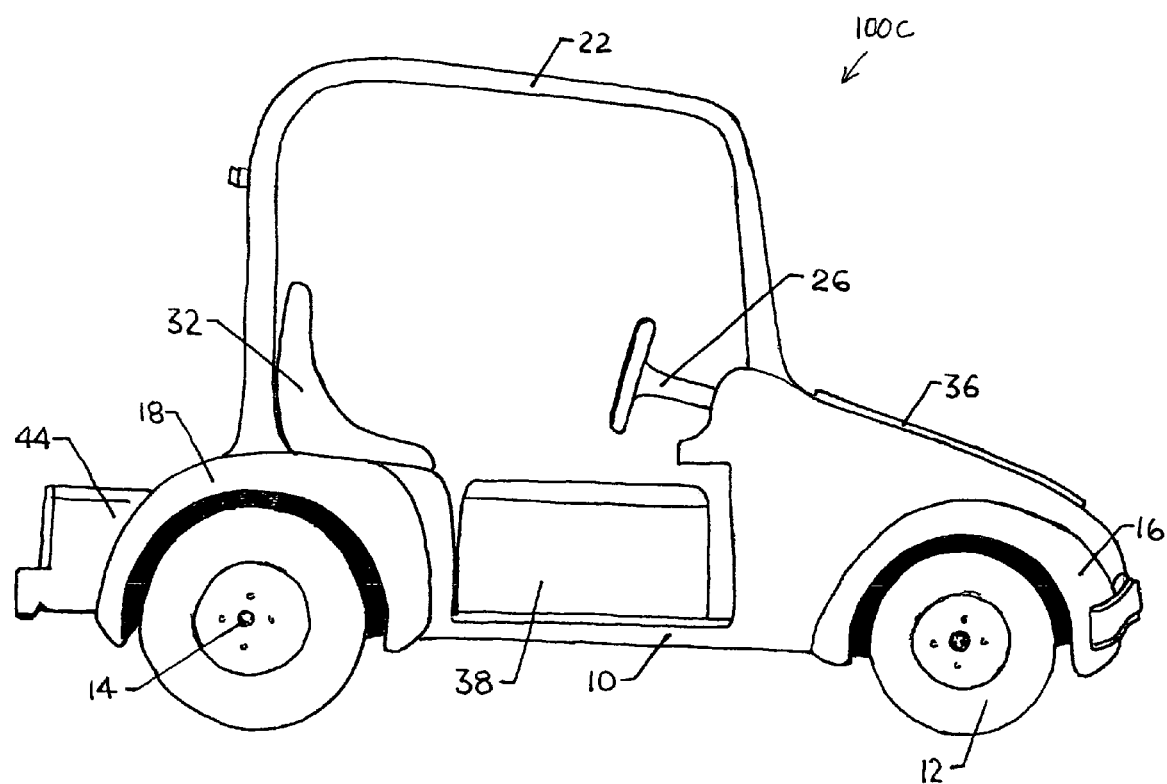
FIG. 6 is a side elevation view of the four-wheel electric wheel-driven vehicle of FIG. 3 with the rear wheels on the left and the front wheels on the right.

FIG. 6 shows a side elevation view of the exemplary four-wheel electric wheel-driven vehicle 100C of FIG. 3. Again, each wheel as shown is mounted on either the front spindle assembly 47 or the rear hub motor or geared induction motor mounting bracket 57. The front nose section has the integrated storage area 36 and the removable storage container 38 can also be seen. FIG. 6 also shows the tool bed with tool attachment 44.

Figure 7:
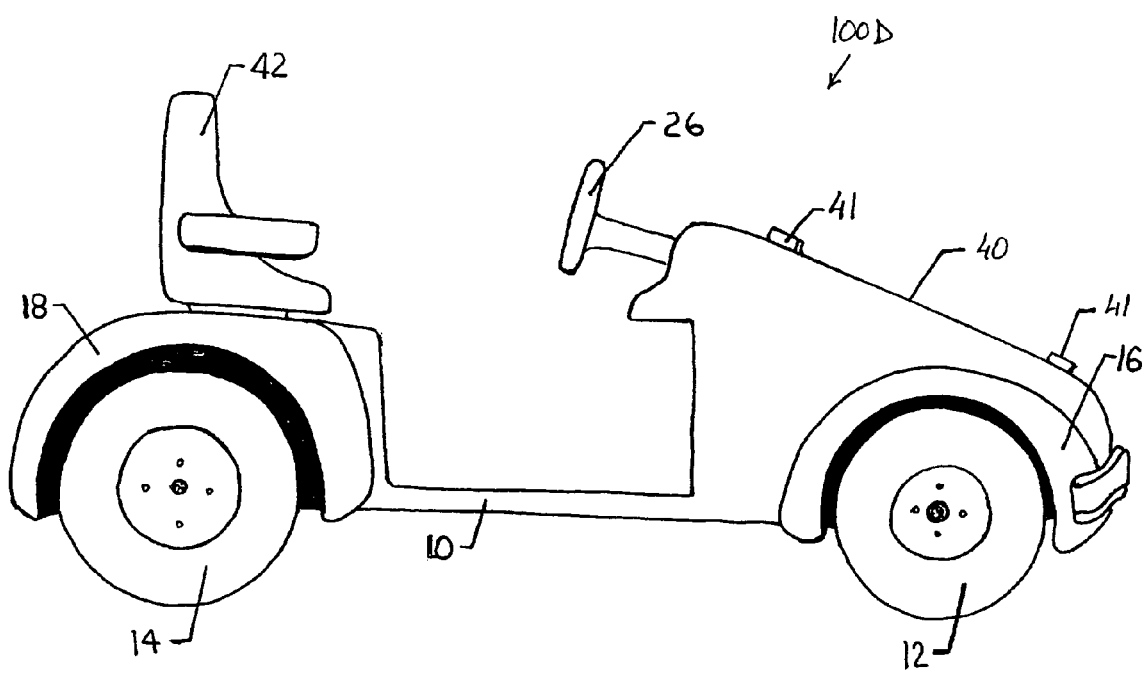
FIG. 7 is a side elevation view of the four-wheel electric wheel-driven vehicle of FIG. 4 with the rear wheels on the left and the front wheels on the right.

FIG. 7 shows a side elevation view of the exemplary four-wheel electric wheel-driven vehicle 100D shown in FIG. 4. As before, each wheel 12 or 14 as shown is mounted on either the front spindle assembly 47 (see FIG. 19) or the rear hub motor or geared induction motor mounting bracket 57 (see FIG. 23A). The front nose section includes the golf bag storage section 40 with attached golf bag retaining device. The swiveling rider seat 42 with safety belt and armrest is also shown, along with the seat/accessory storage and battery storage section 42.

Figure 8:
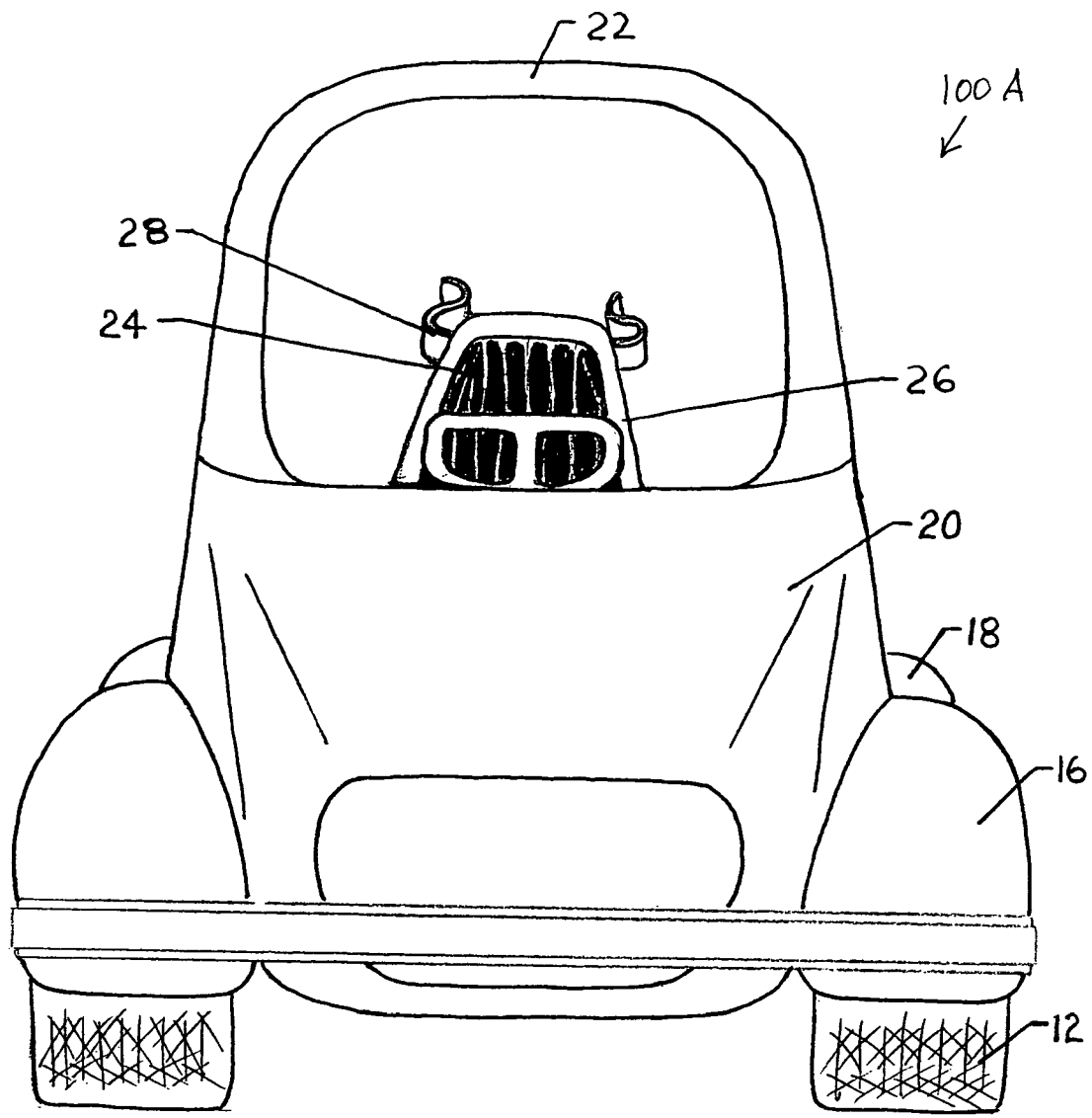
FIG. 8 is a front elevation perspective view of the four-wheel electric wheel-driven vehicle of FIG. 1.
Figure 9:
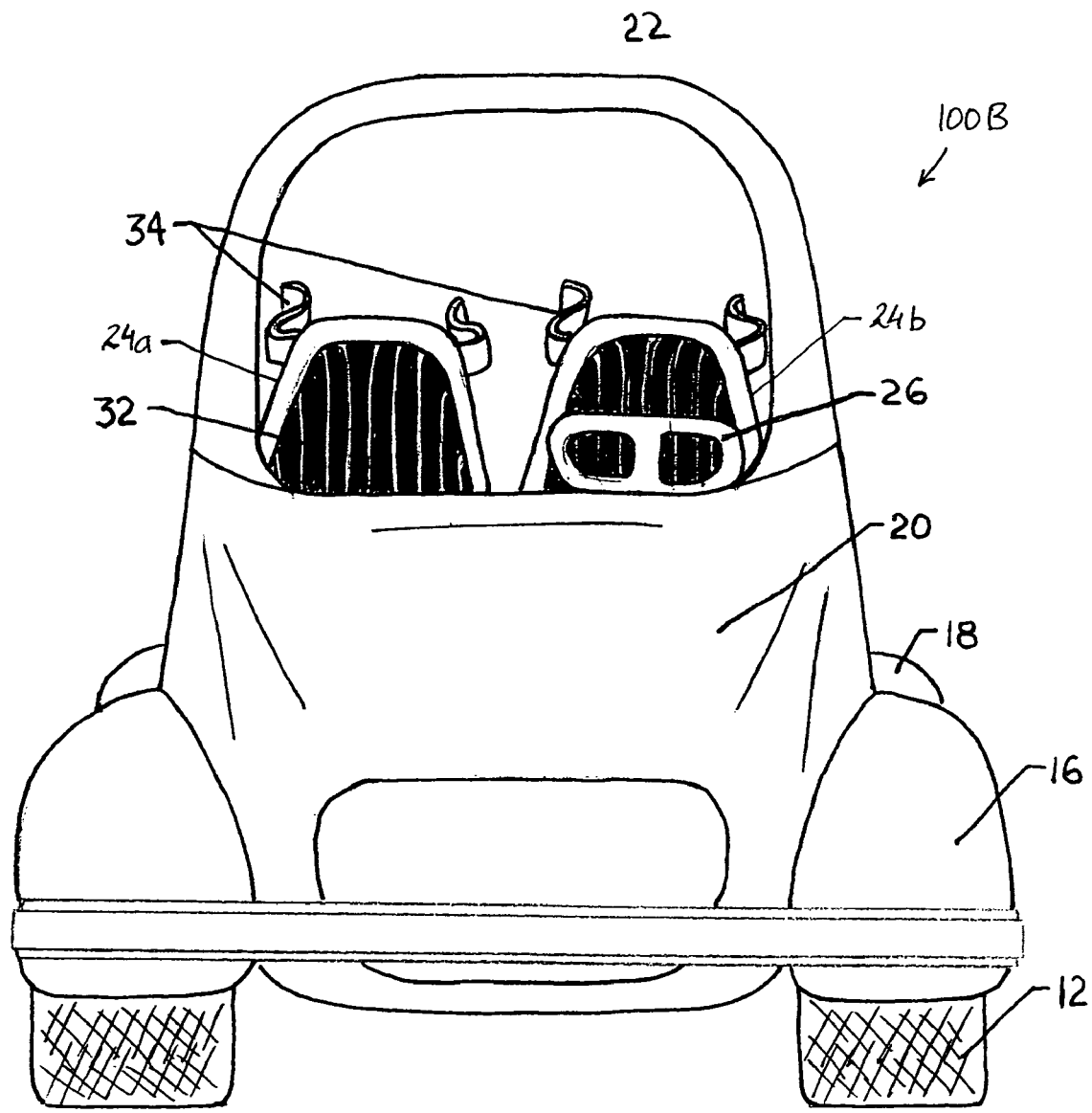
FIG. 9 is a front elevation perspective view of the four-wheel electric wheel-driven vehicle of FIG. 2.
Figure 10:
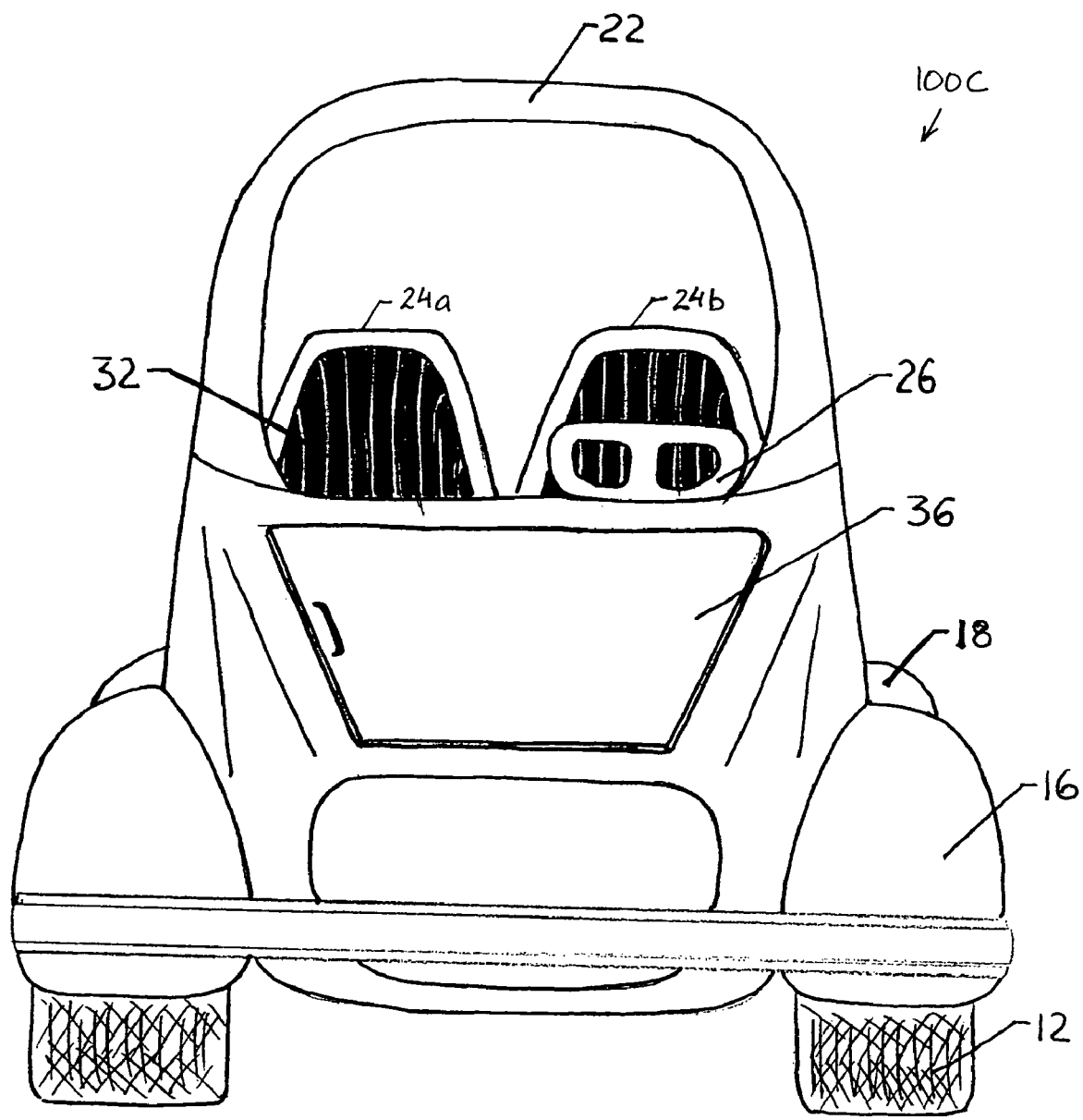
FIG. 10 is a front elevation perspective view of the four-wheel electric wheel-driven vehicle of FIG. 3.
Figure 11:
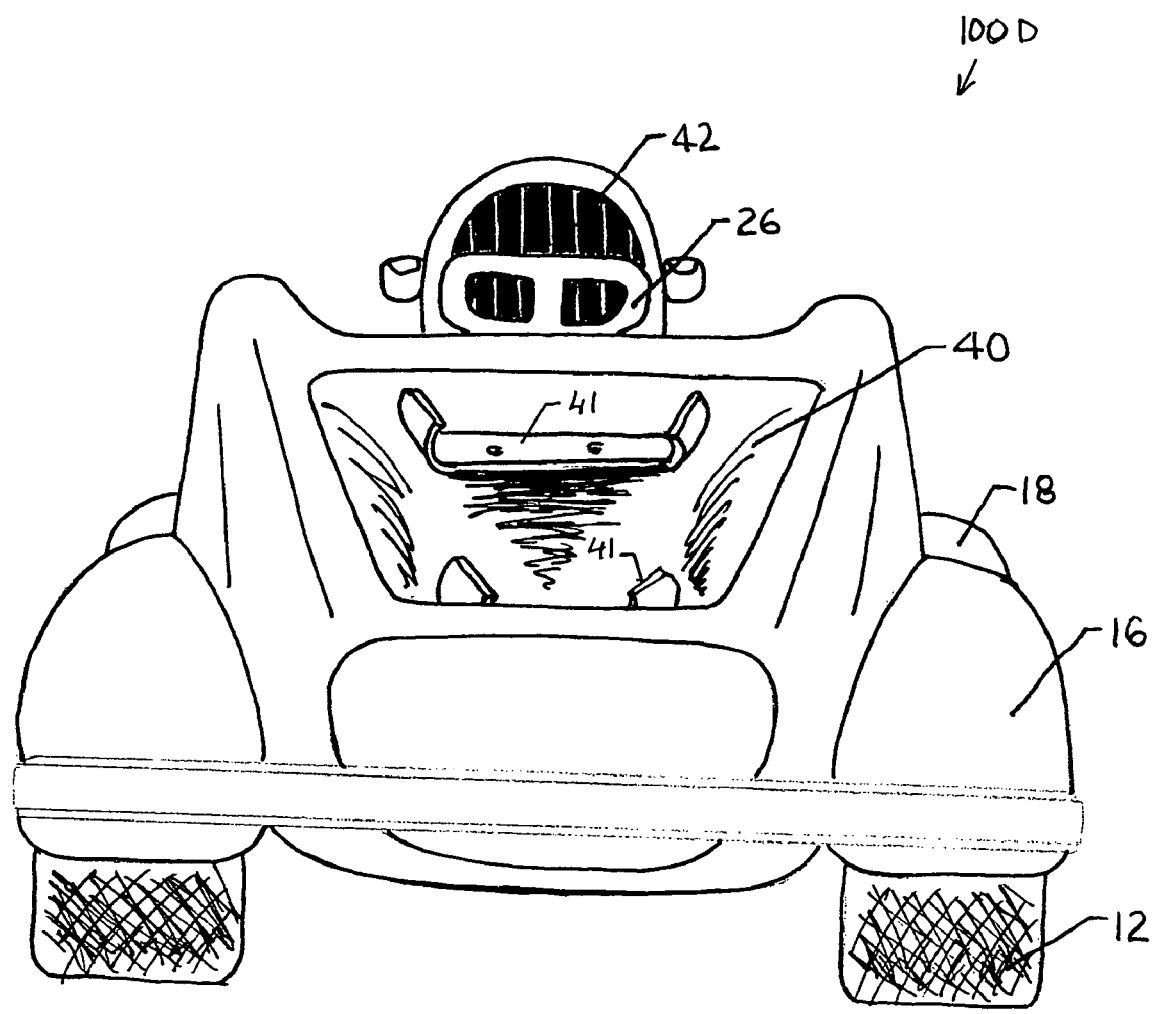
FIG. 11 is a front elevation perspective view of the four-wheel electric wheel-driven vehicle of FIG. 4.

FIG. 8 shows a front perspective elevation view of the exemplary four-wheel electric wheel-driven vehicle 100A shown in FIG. 1, while FIG. 9 shows a front perspective elevation view of the exemplary four-wheel electric wheel-driven vehicle 100B shown in FIG. 2. FIG. 10 shows a front perspective elevation view of the exemplary four-wheel electric wheel-driven vehicle 100C shown in FIG. 3, and FIG. 11 shows a front perspective elevation view of the exemplary four-wheel electric wheel-driven vehicle 100D shown in FIG. 4.

Figure 12:
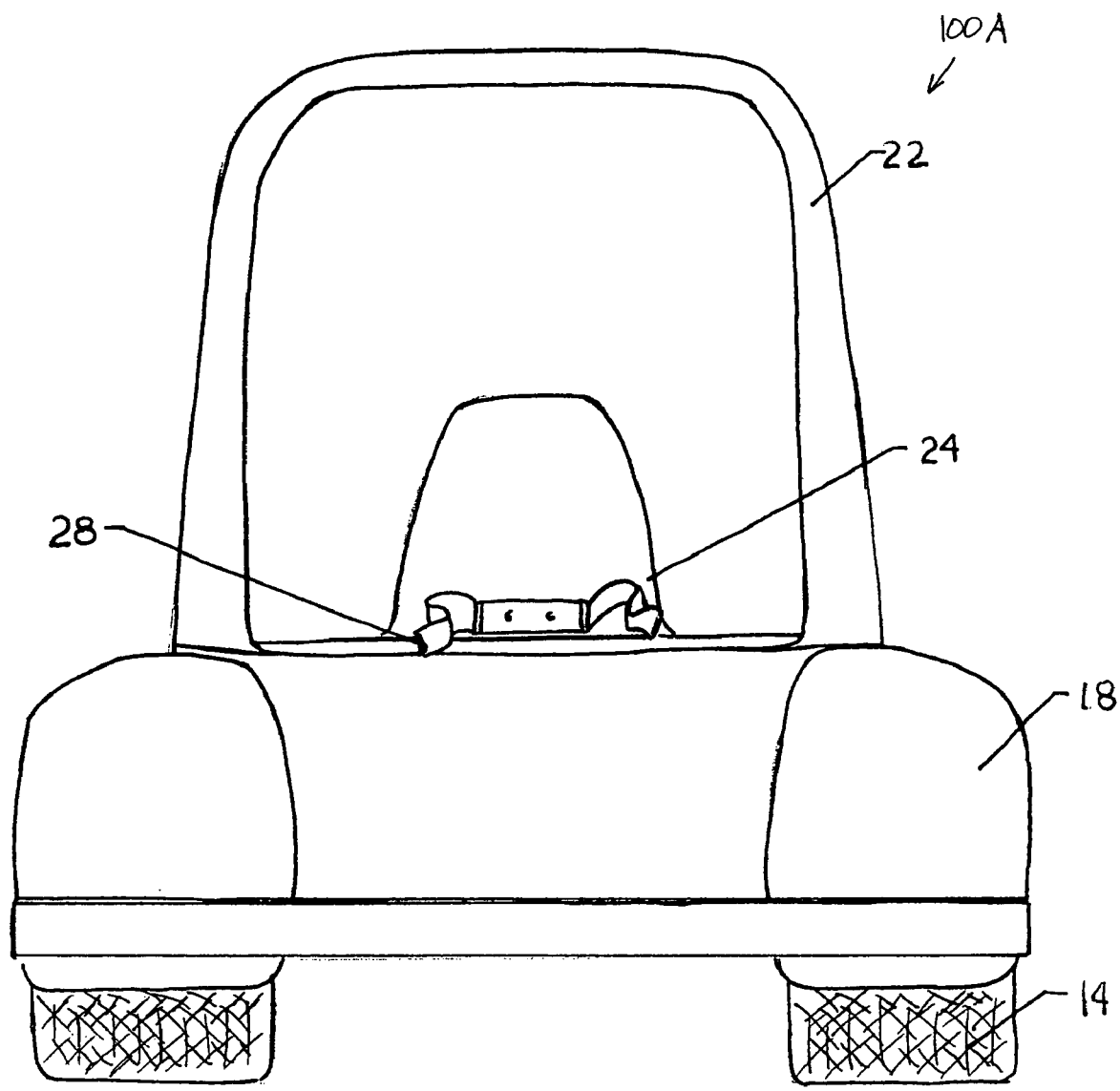
FIG. 12 is a rear elevation perspective view of the four-wheel electric wheel-driven vehicle of FIG. 1.
Figure 13:
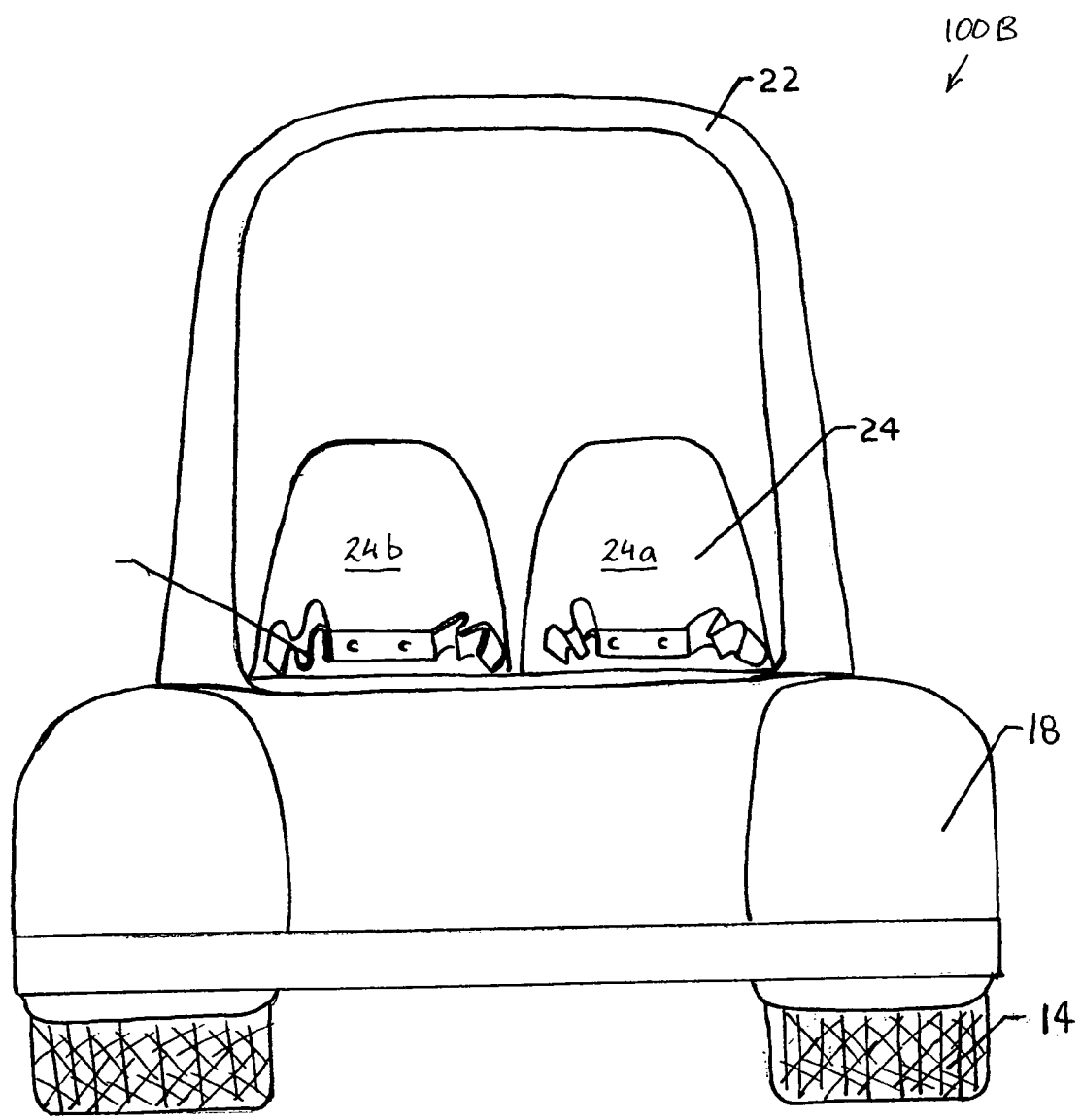
FIG. 13 is a rear elevation perspective view of the four-wheel electric wheel-driven vehicle of FIG. 2.
Figure 14:
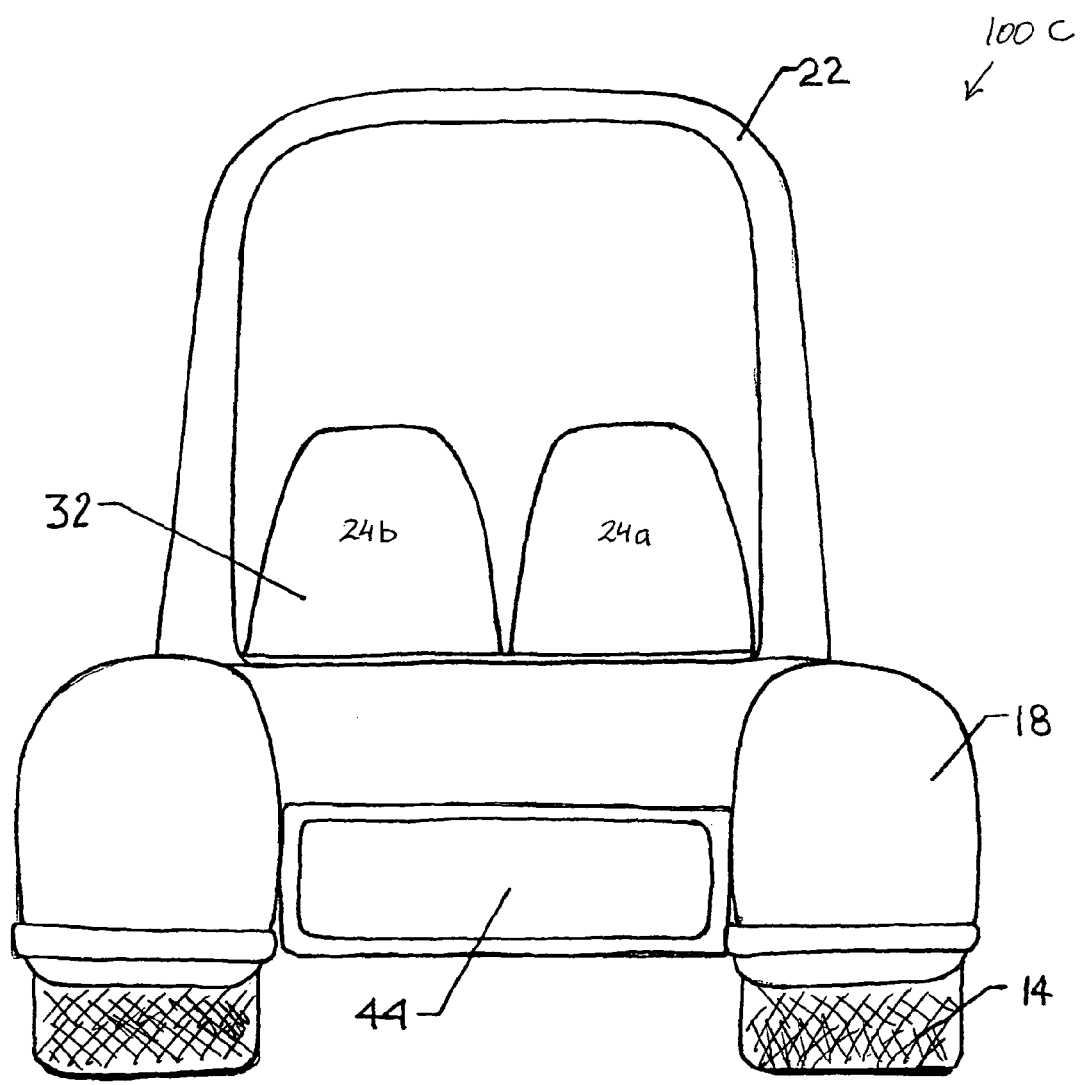
FIG. 14 is a rear elevation perspective view of the four-wheel electric wheel-driven vehicle of FIG. 3.
Figure 15:
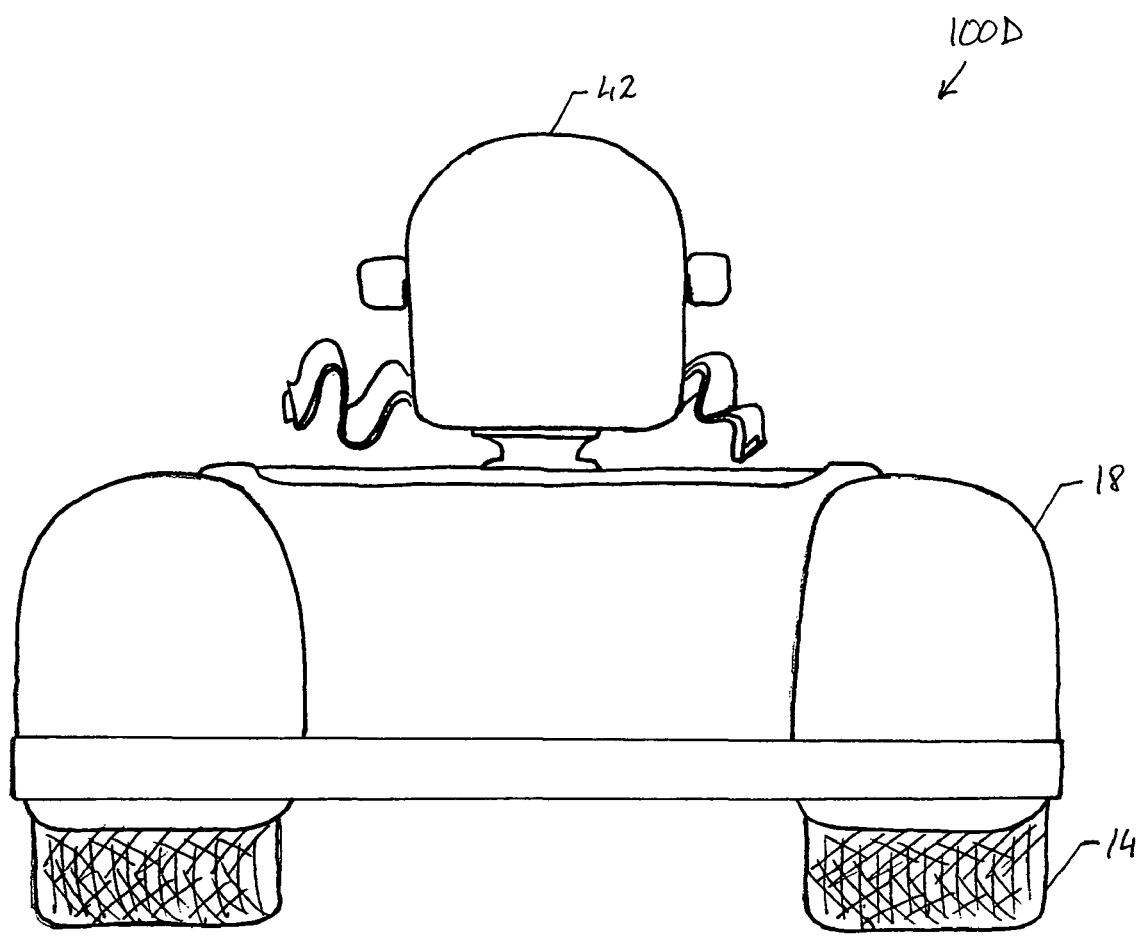
FIG. 15 is a rear elevation perspective view of the four-wheel electric wheel-driven vehicle of FIG. 4.
Figure 16:
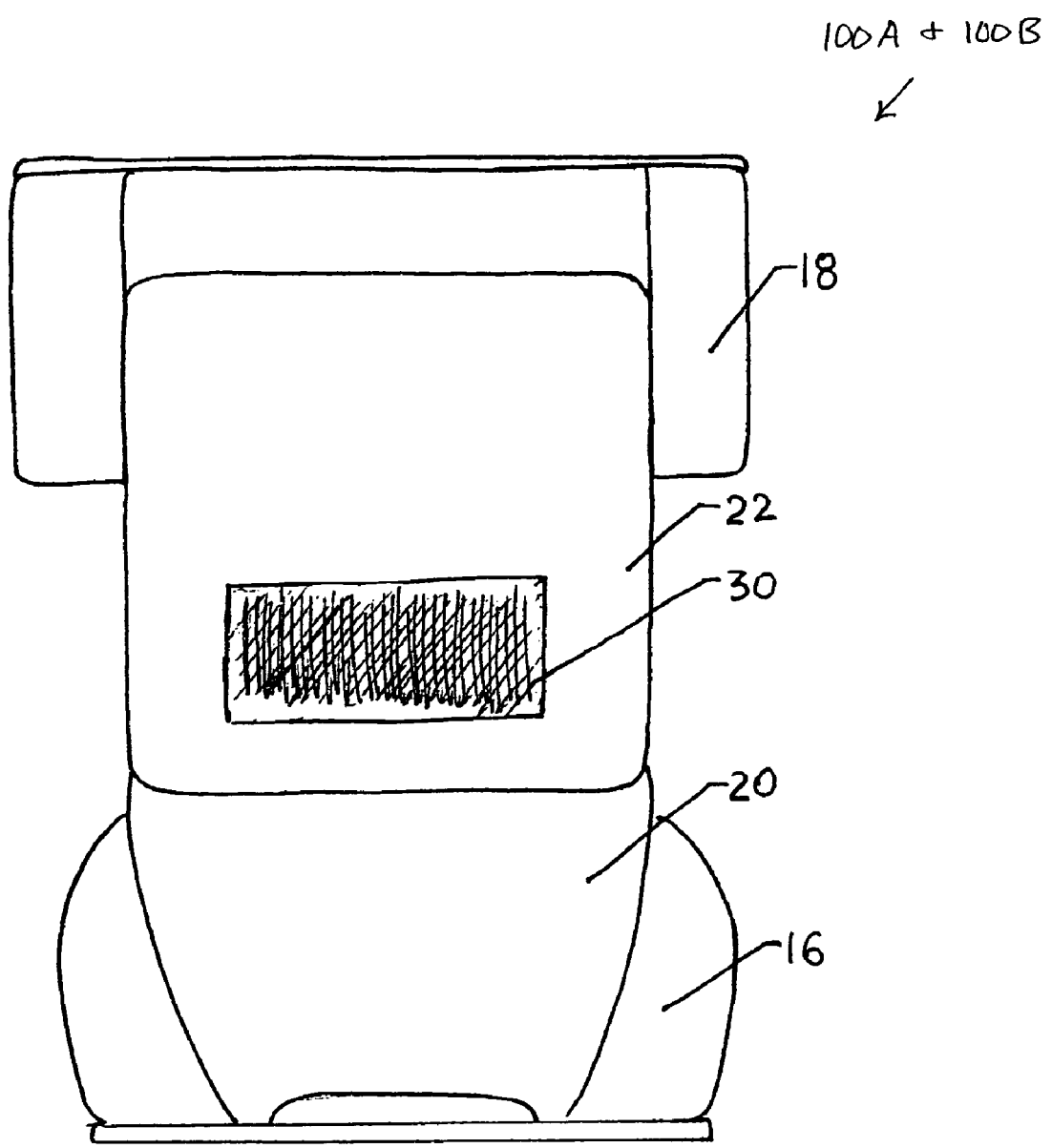
FIG. 16 is a top perspective view of the four-wheel electric vehicle of FIG. 1 and FIG. 2.
Figure 17:
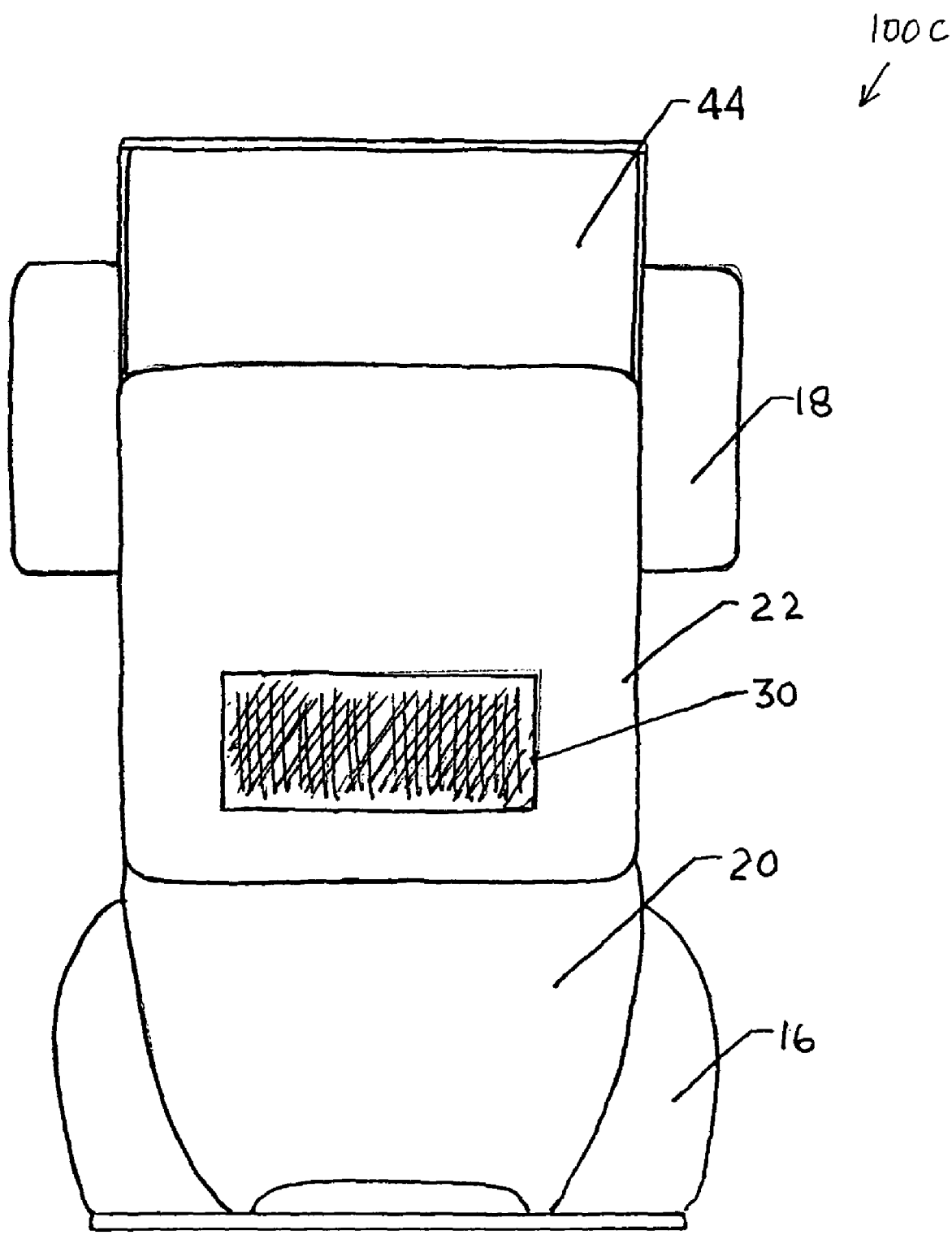
FIG. 17 is a top perspective view of the four-wheel electric wheel-driven vehicle of FIG. 3.
Figure 18:
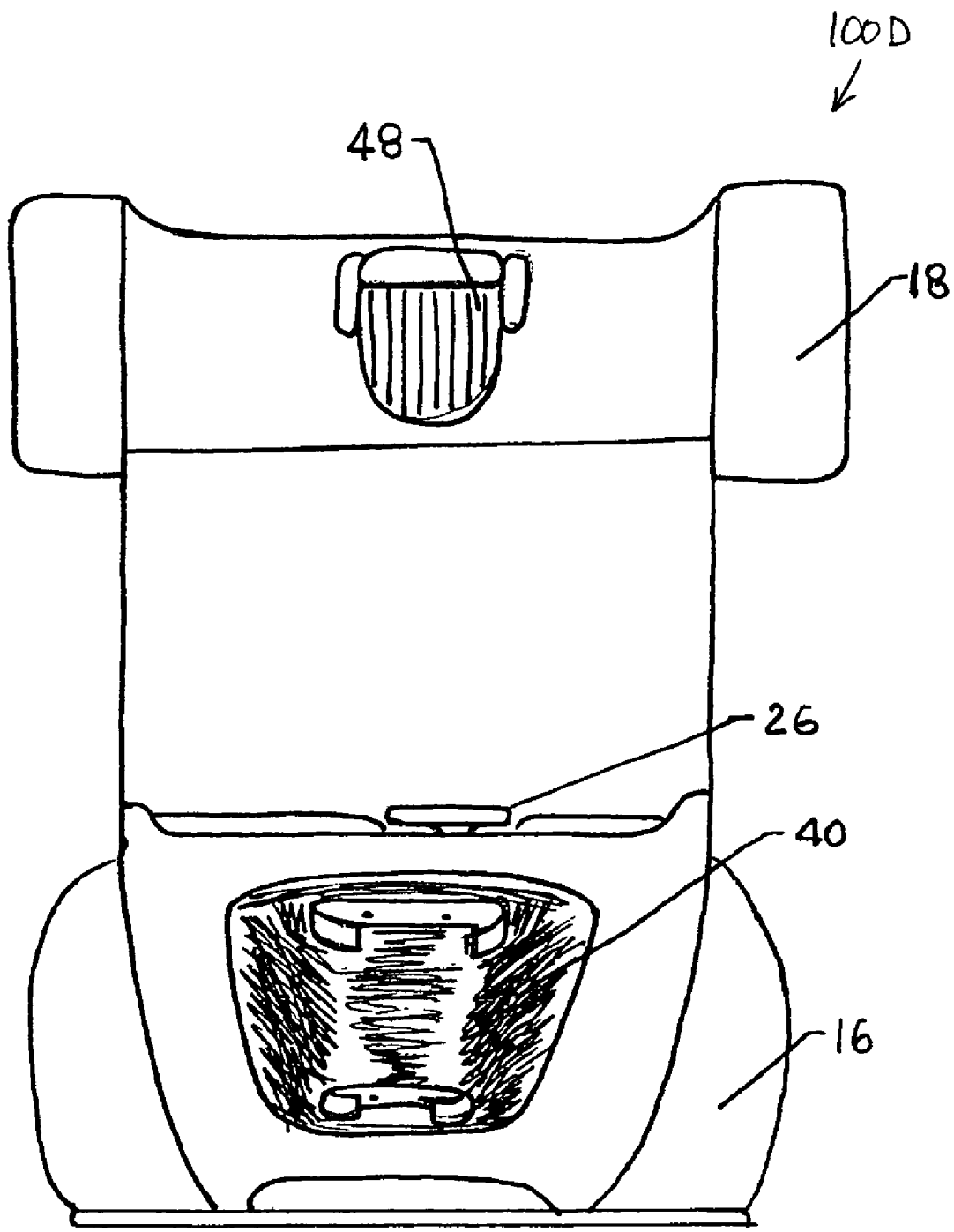
FIG. 18 is a top perspective view of the four-wheel electric wheel-driven vehicle of FIG. 4.

FIG. 12 shows a rear perspective elevation view of the exemplary four-wheel electric wheel-driven vehicle 100A shown in FIG. 1, while FIG. 13 shows a rear perspective elevation view of the exemplary four-wheel electric wheel-driven vehicle 100B shown in FIG. 2. FIG. 14 shows a rear perspective elevation view of the exemplary four-wheel electric wheel-driven vehicle 100C shown in FIG. 3. In FIG. 14, the rear portion of the rider and passenger seat section 32 has been modified to attach a storage container 44. FIG. 15 shows a rear perspective elevation view of the exemplary four-wheel electric wheel-driven vehicle 100D shown in FIG. 4. FIG. 16 shows a top plan view of the exemplary four-wheel electric wheel-driven vehicle 100A & 100B of FIGS. 1 and 2. FIG. 17 shows a top plan view of the exemplary four-wheel electric wheel-driven vehicle 100C of FIG. 3. And FIG. 18 shows a top plan view of the exemplary four-wheel electric wheel-driven vehicle 100D of FIG. 4.

Figure 19:
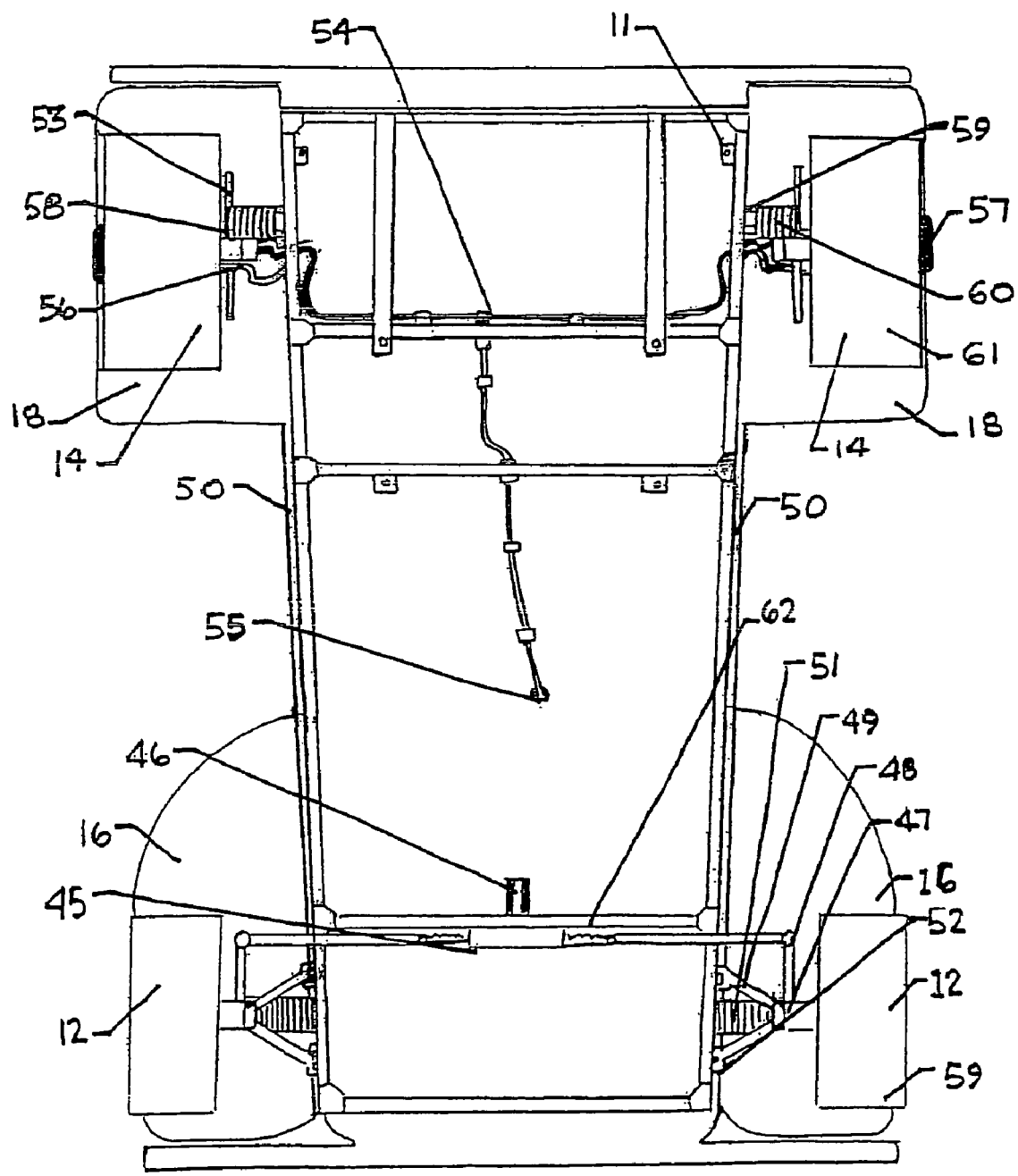
FIG. 19 is a bottom perspective view of the four-wheel electric wheel-driven vehicle of FIG. 1 and FIG. 2.

As for FIG. 19, this figure shows the bottom plan view of the exemplary four-wheel electric wheel-driven vehicles of FIGS. 1 and 2. While rack and pinion steering systems are generally known in the art, the front steering system rack and pinion steering assembly 45 of this invention is shown coupled to the steering shaft 46, and a pair of steering spindles 47 coupled to the rack and pinion steering assembly through a pair of tie rods and swivel ball joints 48. The steering system components 45, 46, 47 are coupled to a pair of front "A" member suspension assemblies 49 that are attached to brackets welded to the longitudinal frame members 50. The front suspension assemblies 49 are supported by a pair of shock absorbers 51 coupled to brackets welded to the longitudinal frame members 52. The shock absorbers 51 may be gas or hydraulic shock absorbers. A pair of front wheel assemblies preferably with urethane foam filled tires 12 are mounted on the front spindle assemblies 47. Rotating the steering shaft rotates the rack and pinion shaft, thereby turning (through internal gears) the steering box shaft coupled to the pair of tie rods. In some embodiments, the tie rods are coupled to the steering box shaft through ball joints 48. The tie rods move laterally, turning the steering spindles forward and aft. This action permits the wheel assemblies to turn, thus steering the vehicle.

A pair of friction disc brakes 53 attached to the drive motor casings (not visible here) slow and stop the vehicle. The friction disc brakes are activated by applying tension to a pair of wire cables 54 attached from the friction disc brakes to the brake pedal 55 activated by the rider. The rear drive system electrical motors receive electrical current from the 24/36/48 volt batteries through isolated wiring looms 56. The rear drive system motors, an integral part of the rear wheel assembly 57, are supported through attachment to the pair of rear "A" member suspension assemblies 58 attached to brackets welded to the longitudinal frame members 59. The rear suspension assemblies 56 are supported by a pair of shock absorbers 60 (e.g., gas shock absorbers). The rear wheel assemblies are welded to the electrical drive motor casings and are mounted to a pair of, for example, urethane tires 61. While a preferred embodiment of disc brakes is described, the skilled mechanic in the art will understand that other brake assemblies may be substituted for the one described.

Figure 20:
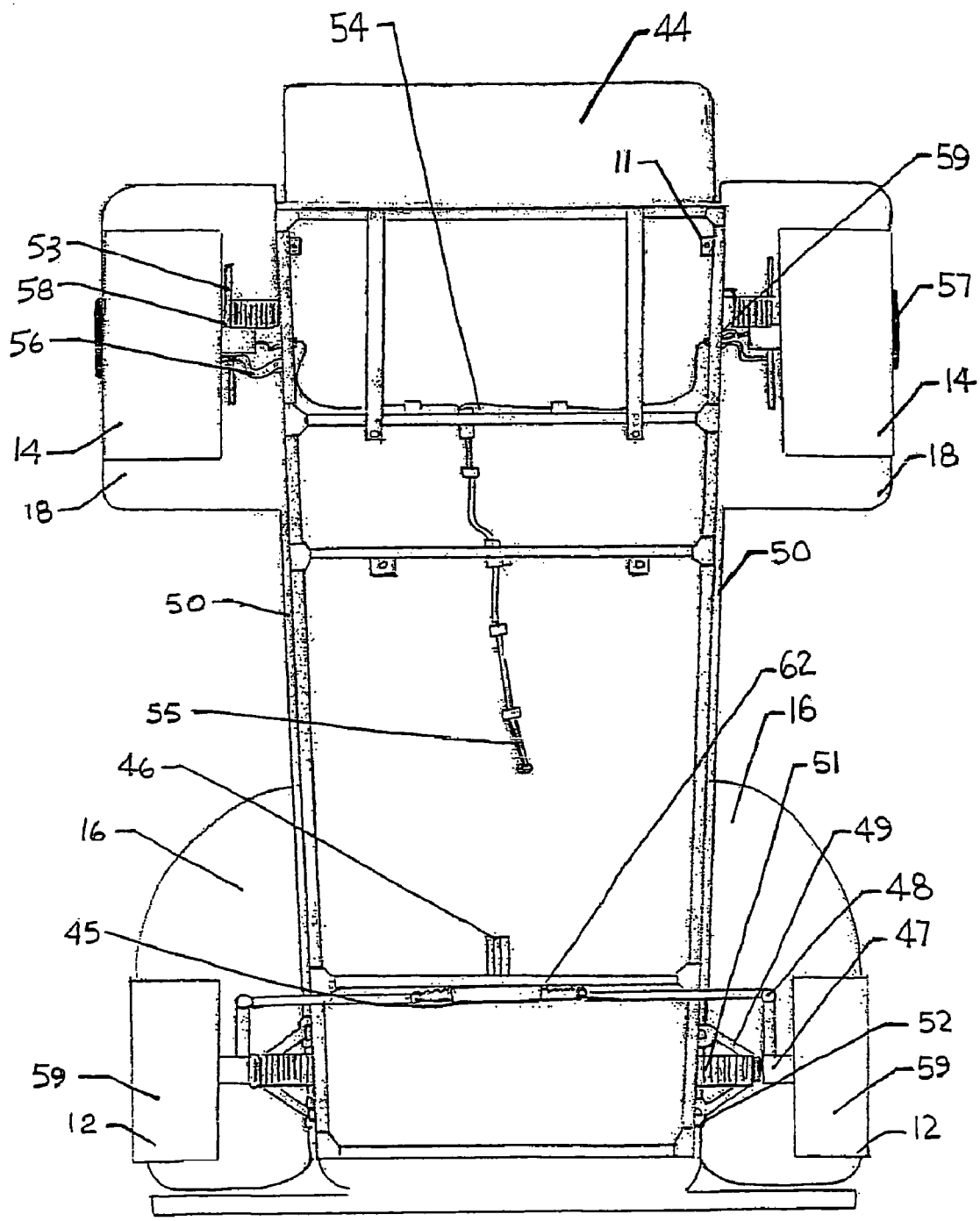
FIG. 20 is a bottom perspective view of the four-wheel electric wheel-driven vehicle of FIG. 3.

FIG. 20 shows the bottom plan view of the exemplary four-wheel electric wheel-driven vehicle of FIG. 3. The front steering system rack and pinion steering assembly 45 is shown coupled to the steering shaft 46, and a pair of steering spindles 47 are coupled to the rack and pinion steering assembly through a pair of tie rods and swivel ball joints 48. The steering system components 45, 46, 47 are coupled to the pair of front "A" member suspension assemblies 49 that are attached to brackets welded to the longitudinal frame members 50. The front suspension assemblies 49 are supported by a pair of shock absorbers 51 (e.g., gas shock absorbers) coupled to brackets welded to the longitudinal frame members 52. A pair of front wheel assemblies with urethane tires 12 are mounted on the front spindle assemblies 47.

Steering the vehicle is achieved in the conventional normal manner by rotating the steering shaft, which in turn rotates the rack and pinion shaft, thereby turning (through internal gears) the steering box shaft coupled to the pair of tie rods. The tie rods are coupled to the steering box shaft through ball joints and move laterally, thus turning the steering spindles forward and aft. This action permits the wheel assemblies to turn, thereby steering the vehicle. A pair of friction disc brakes 53 attached to the drive motor casings slow and stop the moving vehicles. The friction disc brakes are activated by applying tension to a pair of wire cables 54 attached from the friction disc brakes to the brake pedal 55 and activated by the rider. The electric motors receive electrical current from the 24/36/48 volt batteries through isolated wiring looms 56. The motors, an integral part of the rear wheel assembly 57, are supported through attachment to the pair of rear "A" member suspension assemblies 58 attached to brackets that are welded to the longitudinal frame members 59. The rear suspension assemblies 56 are supported by a pair of shock absorbers 60 (e.g., gas shock absorbers). The rear wheel assemblies are welded to the electrical drive motor casings and are mounted to a pair of urethane tires 61.

Figure 21:
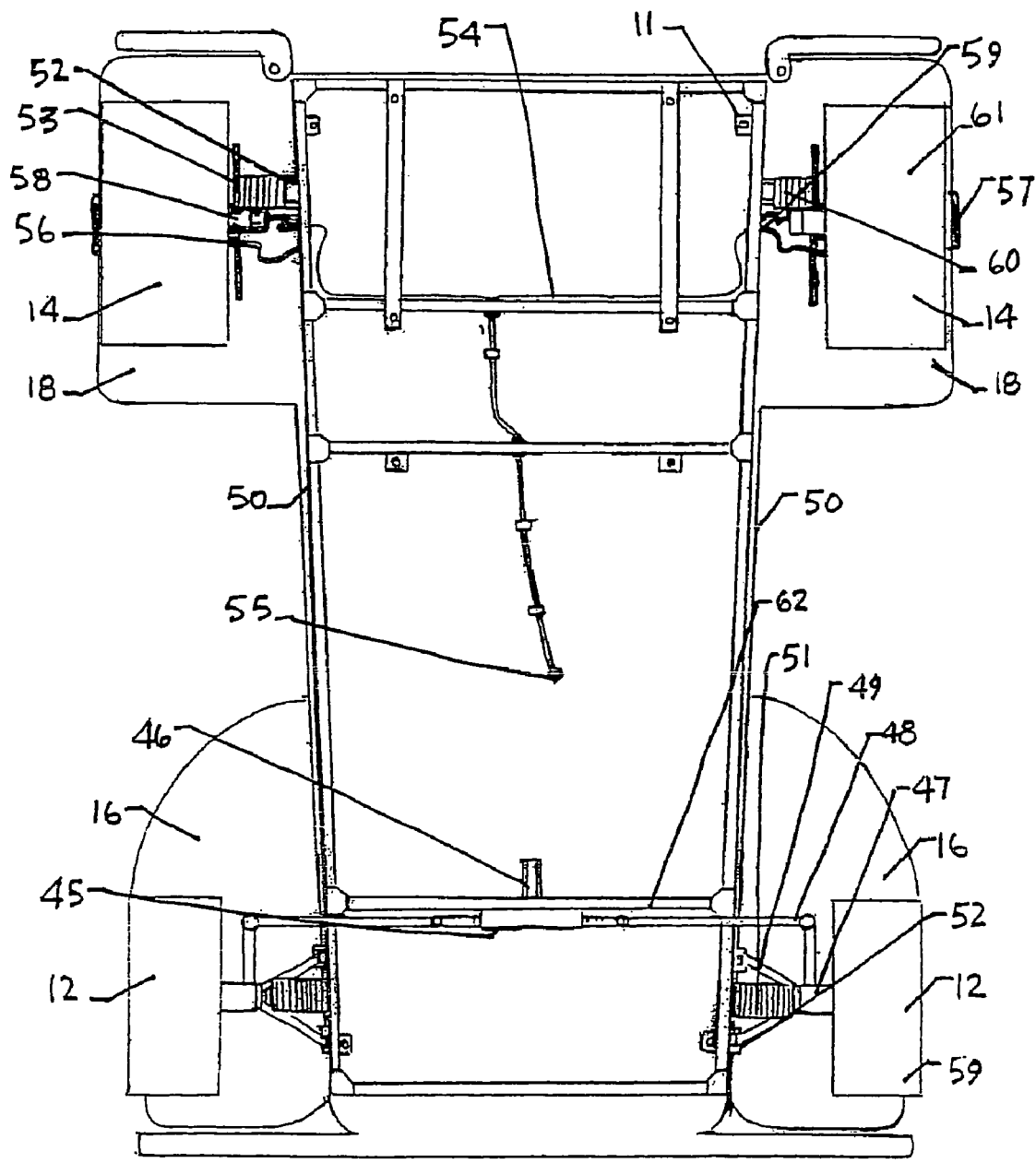
FIG. 21 is a bottom perspective view of the four-wheel electric wheel-driven vehicle of FIG. 4.

FIG. 21 shows the bottom plan view of FIG. 4. As can be seen, the front steering system rack and pinion steering assembly 45 is coupled to the steering shaft 46, and a pair of steering spindles 47 are coupled to the rack and pinion steering assembly through a pair of tie rods and swivel ball joints 48. The steering system components 45, 46, 47 are coupled to a pair of front "A" member suspension assemblies 49 attached to brackets welded to the longitudinal frame members 50. The front suspension assemblies 49 are supported by a pair of shock absorbers 51 coupled to brackets that are welded to the longitudinal frame members 52. A pair of front wheel assemblies with urethane tires 12 are mounted on the front spindle assemblies 47.

As before, rotating the steering shaft rotates the rack and pinion shaft, thereby turning, through internal cogged gears, the steering box shaft coupled to a pair of tie rods. The tie rods are coupled to the shaft through ball joints and move laterally, thereby turning the steering spindles forward and aft. Again, this action permits the wheel assemblies to turn, thus steering the vehicle. A pair of friction disc brakes 53 are attached to the drive motor casings and serve to slow and stop the moving vehicles. The friction disc brakes are activated by applying tension to a pair of wire cables 54 attached from the friction disc brakes to the brake pedal 55 activated by the rider. The rear drive system electrical motors receive electrical current from the 24/36/48 volt batteries through isolated wiring looms 56. The rear drive system motors, an integral part of the rear wheel assembly 57 are supported through attachment o the pair of rear "A" member suspension assemblies 58 attached to brackets welded to the longitudinal frame members 59. The rear suspension assemblies 56 are supported by a pair of shock absorbers 60. The rear wheel assemblies are welded to the electric motor casings and are mounted to a pair of urethane tires 61.

Figure 22B:
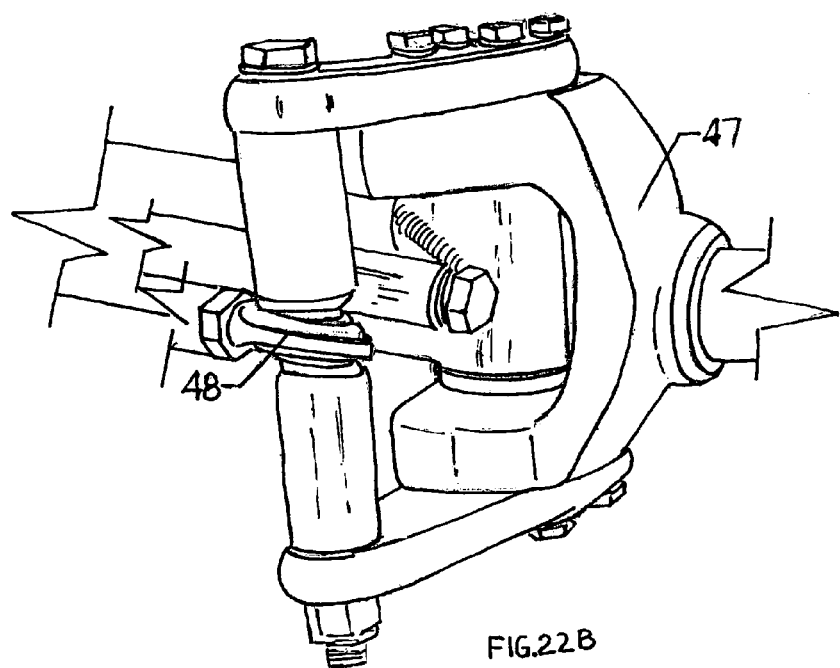
FIGS. 22A and 22B are detailed views of an exemplary steering assembly.
Figure 22A:
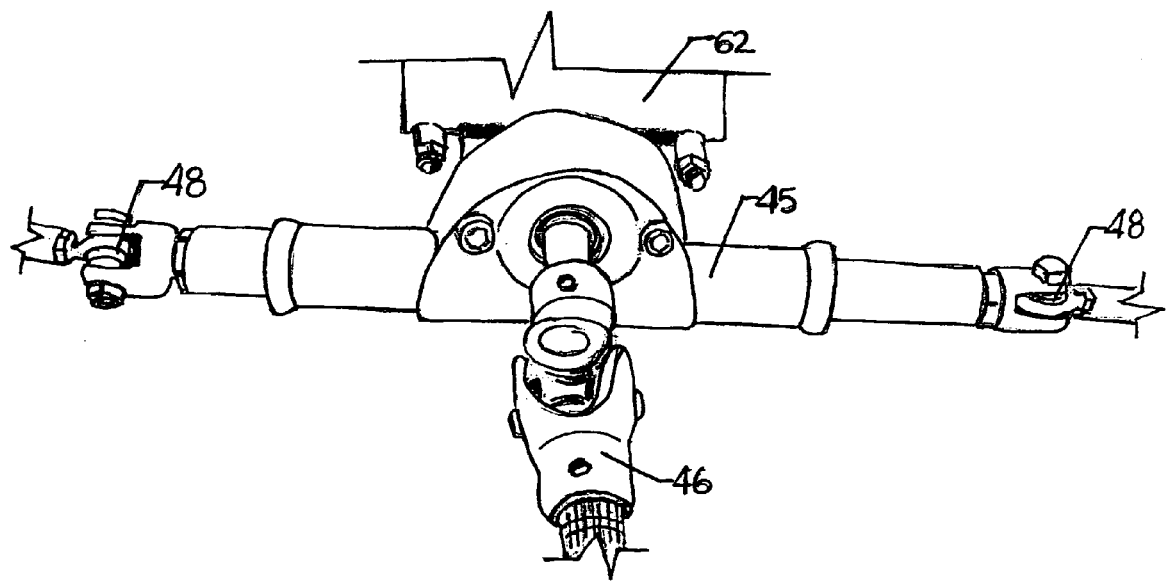

FIG. 22A shows a detailed view of the steering spindle assembly 47 (see FIGS. 19, 20, and 21) which itself is well known in the art as it is coupled to the rod and ball joint 48 attached to the front suspension "A" member 49.

FIG. 22B shows a detailed view of the steering rack and pinion assembly 45 (see FIGS. 19, 20, and 21), also a standard item, being coupled to the pair of tie rods and ball joints 48 and steering shaft 46. The steering rack and pinion assembly 45 is attached to the front transverse vehicle frame support member 62.

Figure 23B:
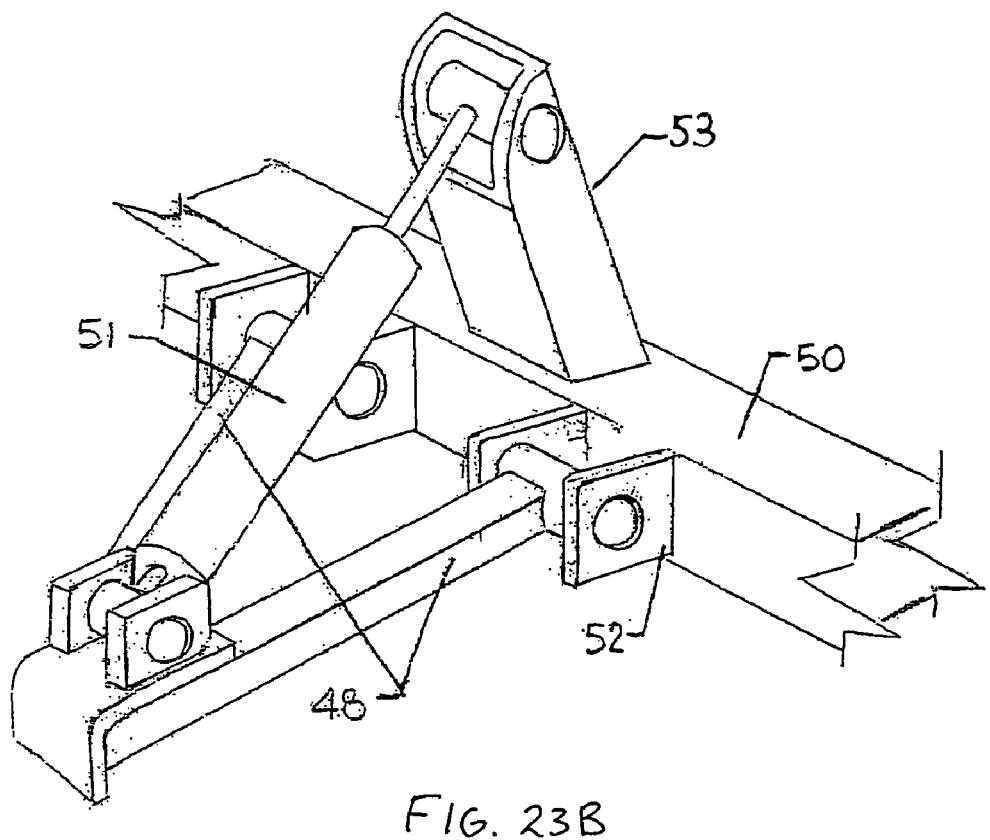
FIGS. 23A and 23B are detailed views of an exemplary rear suspension assembly and front suspension assembly.
Figure 23A:
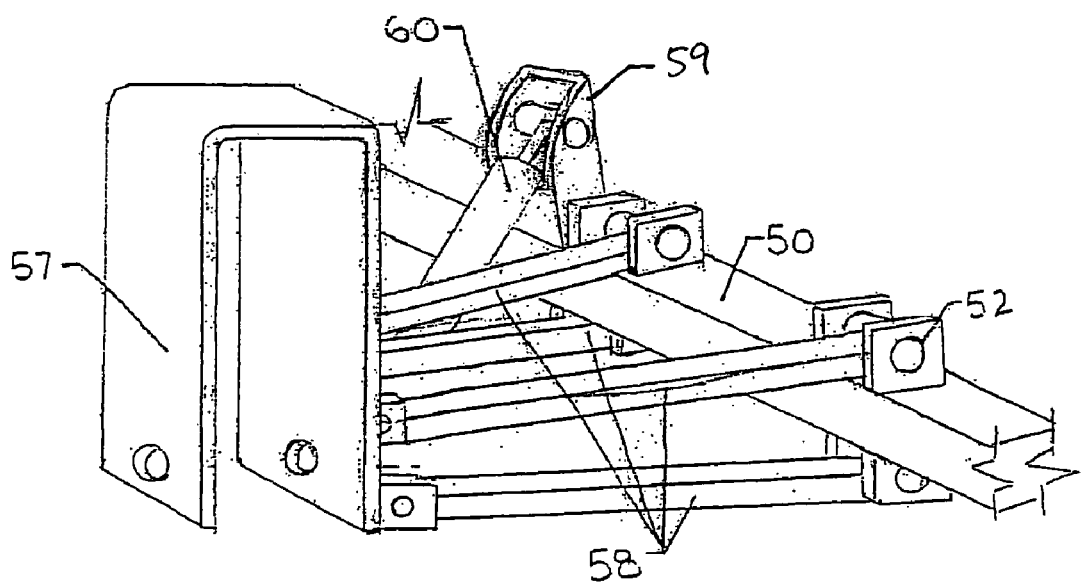

FIG. 23A shows a detailed view of the rear suspension "A" member assembly 58 (see FIGS. 19, 20, and 21) welded to the drive wheel assembly 57 and movably coupled to the longitudinal frame member 50 through brackets 52. The rear suspension "A" member shock absorbers 60 are operatively coupled to the bracket 59 and rear suspension "A" member 58. The rear suspension "A" member assembly allows vertical movement and restricts lateral movement of the drive system.

FIG. 23B shows a detailed view of the front suspension "A" member assembly 48 that is (see FIGS. 19, 20, and 21) movably coupled to the steering spindle assembly 47 and to the longitudinal frame member 50 through brackets 52 (see FIGS. 19, 20, and 21). The front suspension "A" member shock absorbers 51 are coupled to the bracket 53 welded to the longitudinal frame 50. The front suspension "A" member assembly allows vertical movement and restricts lateral movement of the steering system.

Figure 24B:
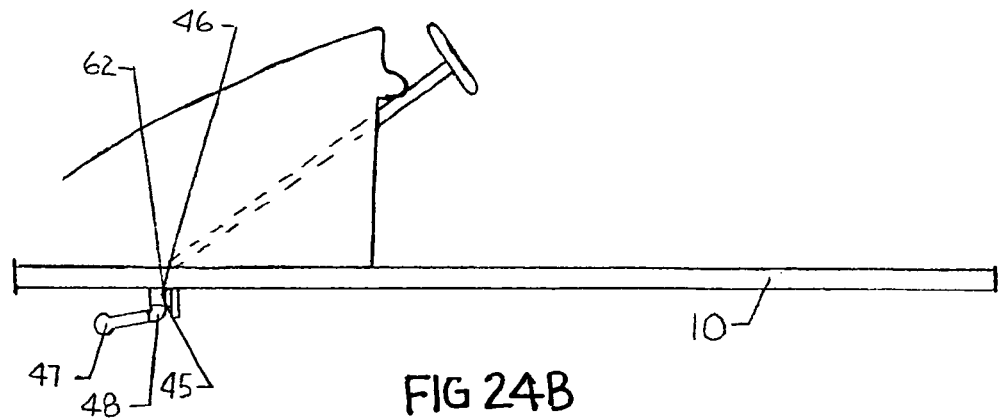
FIG. 24B is a side perspective view of the four-wheeled electric powered wheel driven vehicle of FIG. 4.
Figure 24A:
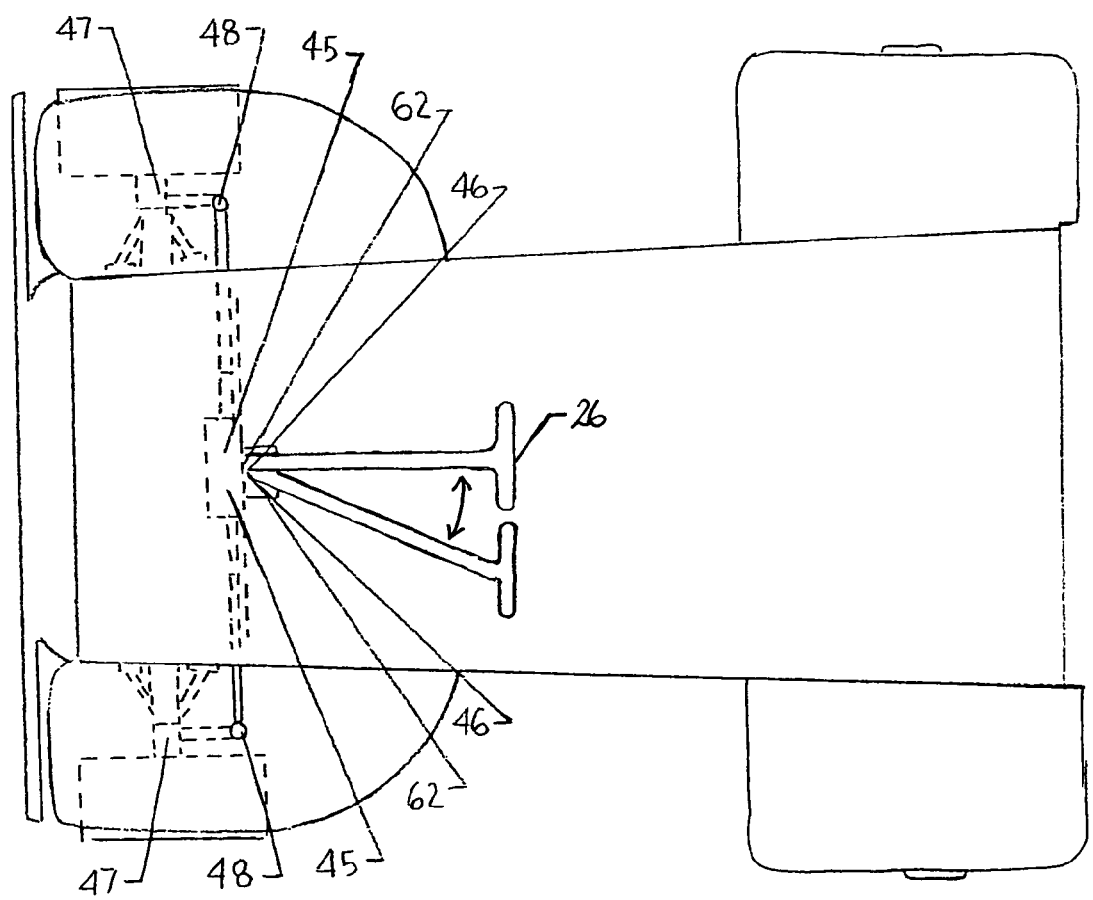
FIG. 24A is a top perspective view of the four-wheeled electric powered wheel driven vehicle of FIG. 4.

FIG. 24A shows a top perspective plan view of the steering assembly of the four-wheel electric wheel-driven vehicle (see FIGS. 1, 2, 3, and 4), including the steering spindle assembly 47, front suspension "A" member 48 (see FIGS. 19, 20, and 21), steering rack and pinion assembly 45, front transverse vehicle frame support member 62, and steering shaft 46.

FIG. 24B shows a side perspective view of the steering assembly of the four-wheel electric wheel-driven vehicle (see FIGS. 1, 2, 3, and 4), including the frame 10, steering rack and pinion assembly 45, front suspension "A" member 48, steering spindle assembly 47, and front transverse vehicle frame support member 62.

Figure 25:
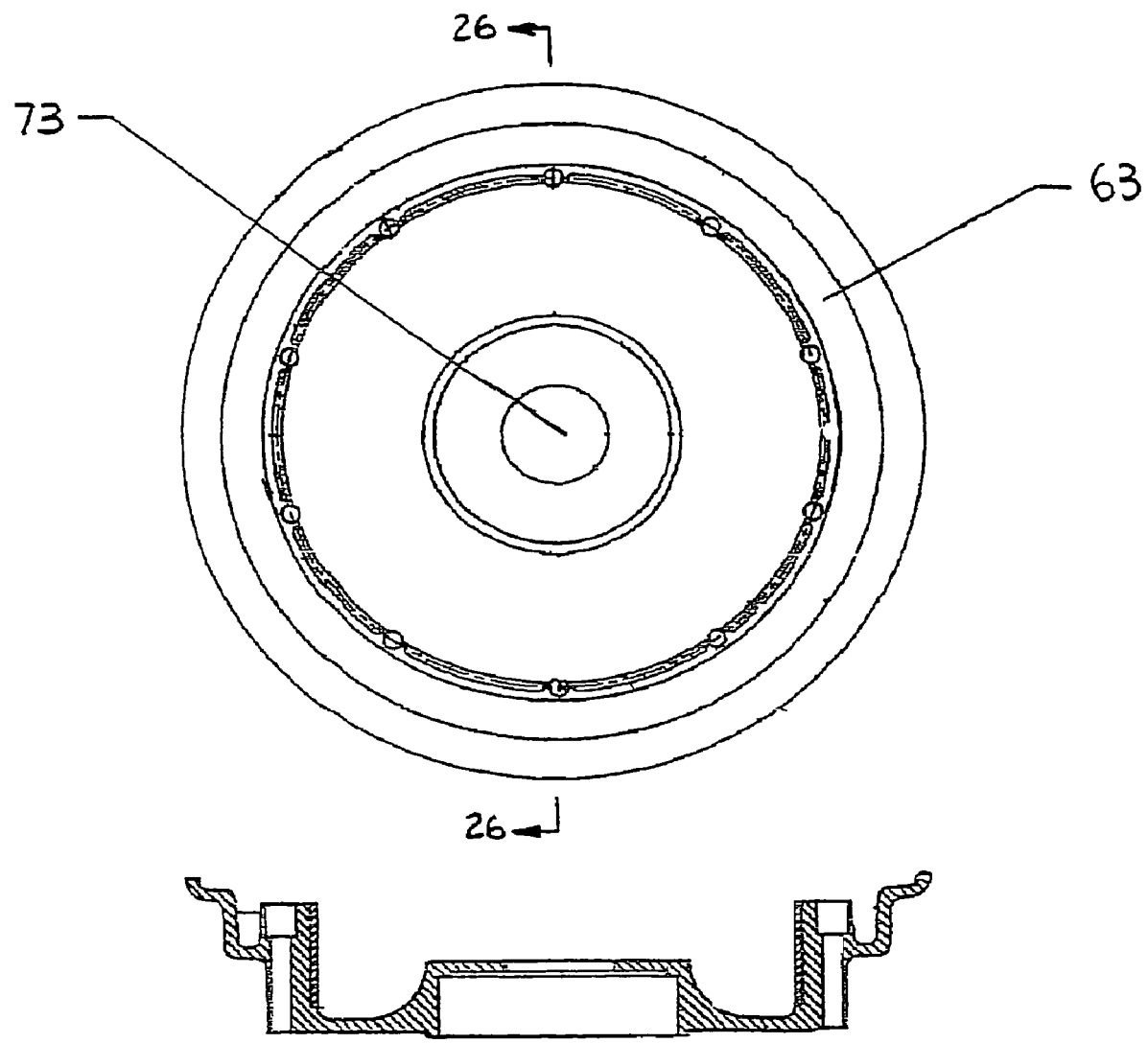
FIG. 25 is a side perspective view of the 24/36/48 volt electric hub motor and cast aluminum alloy hub motor housing heel.

FIG. 25 shows a side perspective view and a cross-section view of a cast aluminum alloy housing/wheel 63 attached to a stationary rear axle shaft 73 in which a 24/36/48 volt electric hub motor may be mounted.

Figure 26:
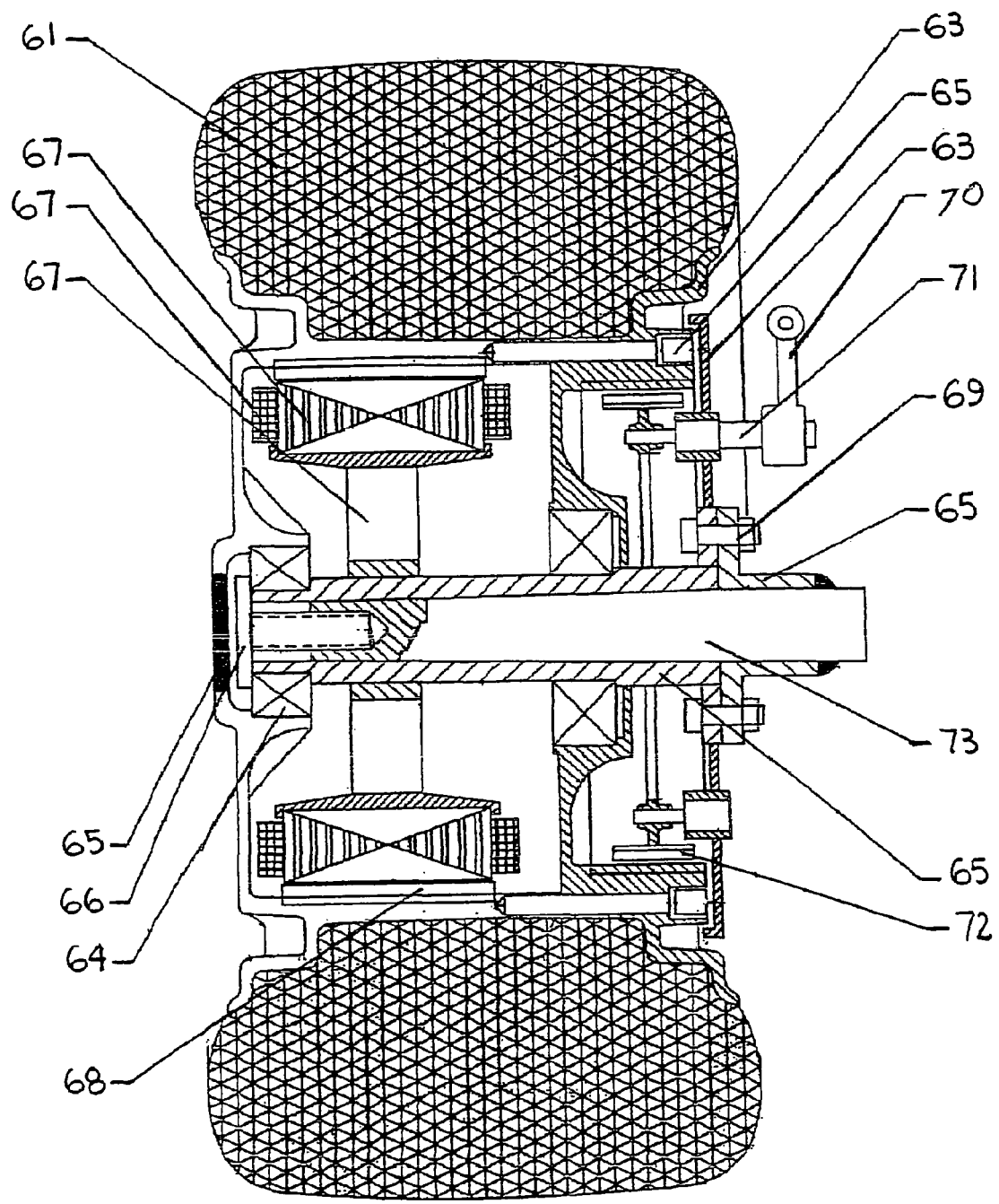
FIG. 26 is a detailed view of the 24/36/48 volt electric hub motor, cast aluminum alloy housing/wheel and solid polyurethane tire.

FIG. 26 shows a detailed perspective view of the 24/36/48 volt electric hub motor assembly, including the cast aluminum alloy housing/wheel 63, hub motor bearings 64, seals 65 and retainers 66, electric armature stator 67 and rotor 68, coupling bolts 69, mechanical braking lever 70, brake actuator rod 71, and braking shoes 72. A solid polyurethane from tire 61 is retained by surface tension to the cast aluminum housing/wheel 63. The 24/36/48 volt electric hub motor assembly 62-72 rotates on a center, stationary rear axle shaft 73 (see FIGS. 1, 2, 3, and 4).

Figure 27A:
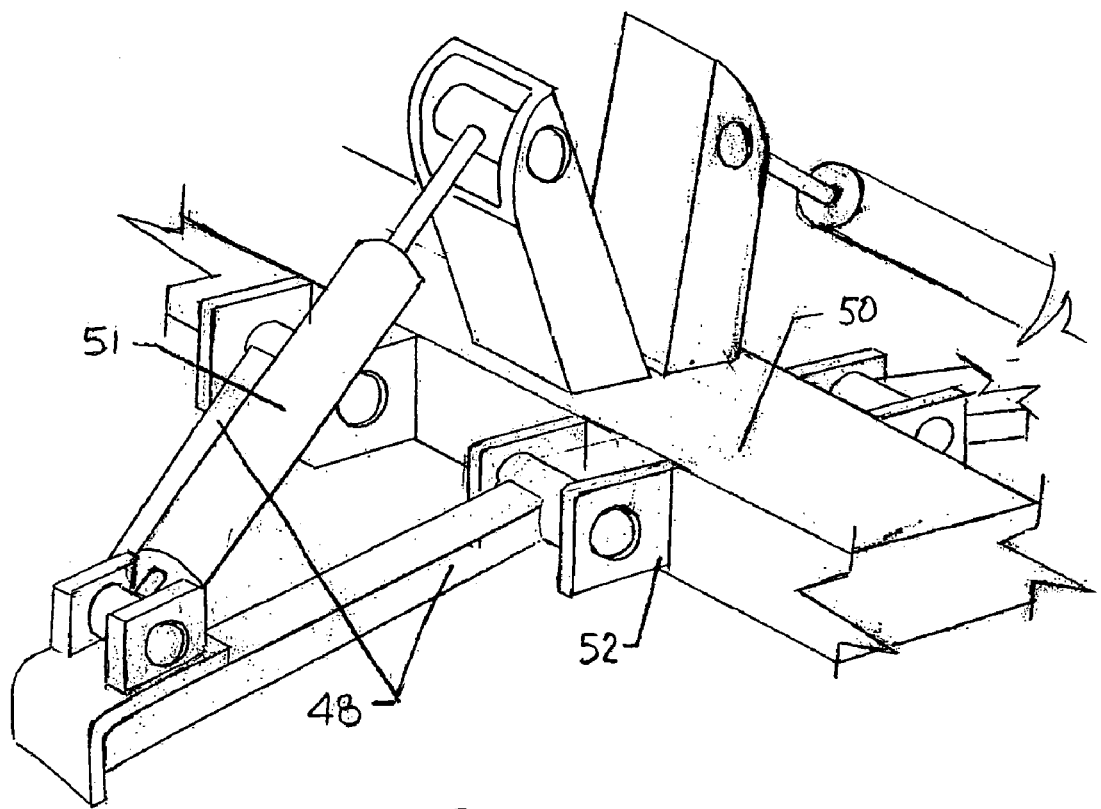
FIG. 27 is detailed view of an another exemplary rear suspension assembly.
Figure 27:
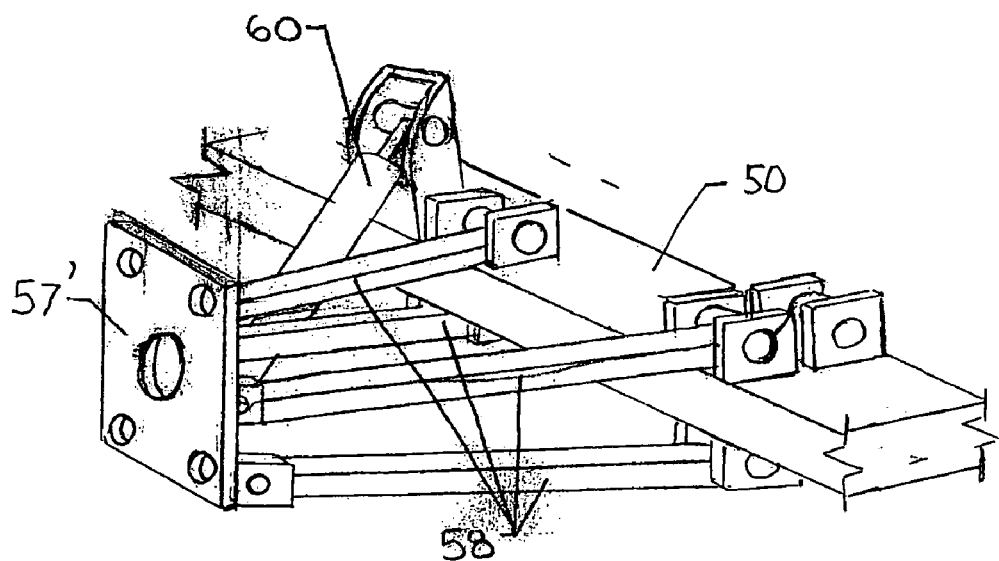

FIG. 27 is detailed view of an another exemplary rear suspension assembly according to embodiments of invention. The rear suspension assembly in FIG. 27 is substantially similar to the rear suspension assembly in FIG. 23A, except that the mounting bracket 57 has now been replaced by a mounting plate 57'. The housing/wheel 63 may then be attached directly to the mounting plate 57'.

Figure 28:
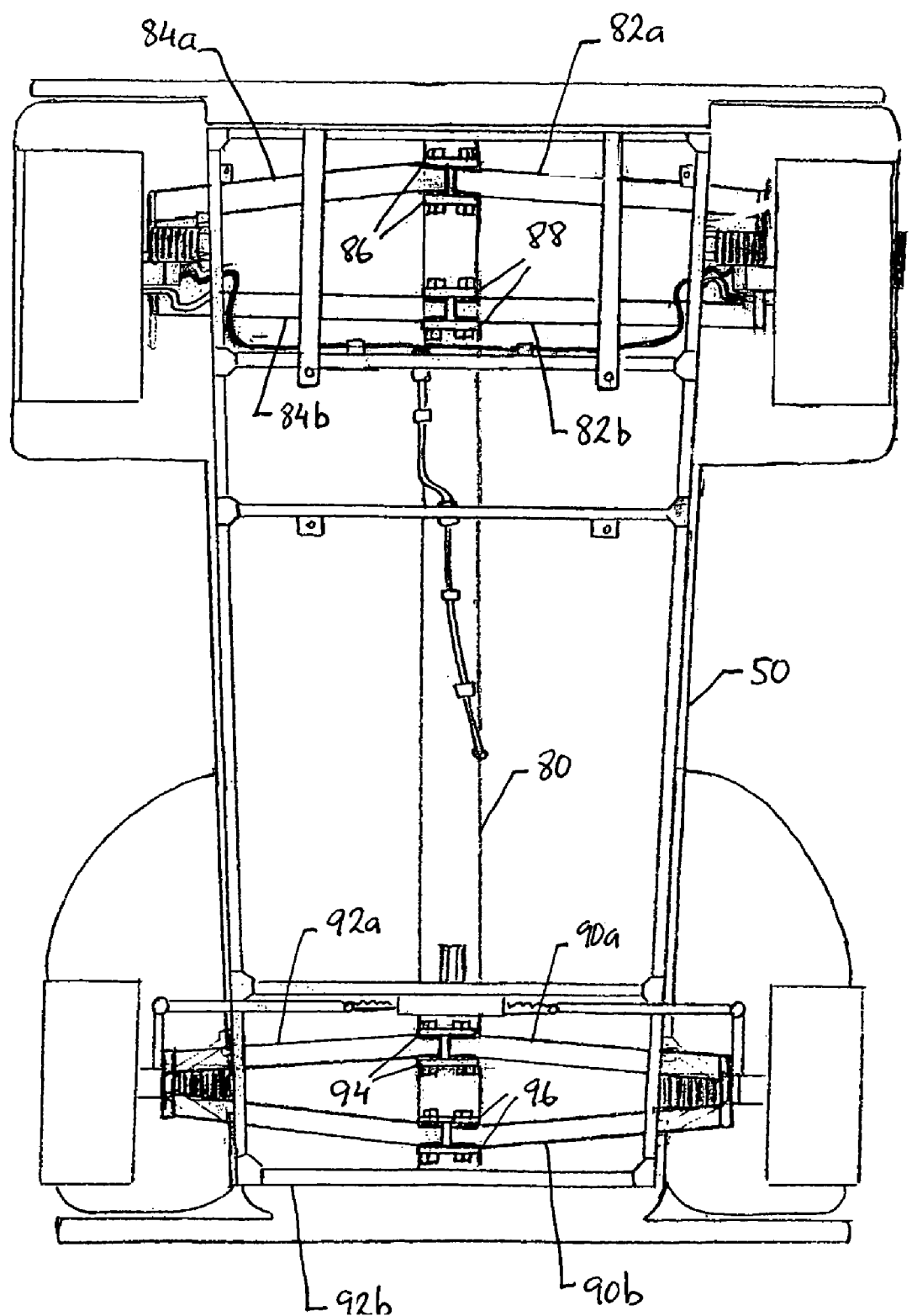
FIG. 28 is a bottom perspective view of the four-wheel electric wheel-driven vehicle of FIG. 1 and FIG. 2 with a spine member and alternative wheel support assembly.

FIG. 28 is a bottom perspective view of the four-wheel electric wheel-driven vehicle of FIG. 1 and FIG. 2. The four-wheel electric wheel-driven vehicle of FIG. 28 is substantially similar to the one shown in FIG. 19, except that a spine member 80 is attached to and extends longitudinally down the middle of the frame 50. The spine member 80 is sometimes referred to as a uni-body insofar as it may be used to support the wheels instead of the frame 50. The rear suspension assembly 58 has been replaced by rear wheel support members 82a & 82b and 84a & 84b. The rear wheel support members 82a & 82b and 84a & 84b may be pivotably mounted to the spine member 80 such that they swivel vertically relative to the spine member 80. The mounting may be achieved using any technique known to those having ordinary skill in the art, but in one embodiment, the rear wheel support members 82a & 82b and 84a & 84b are mounted to the spine member 80 via a pair of mounting plates 86 and 88. Likewise, the front suspension assembly 49 has been replaced by front wheel support members 90a & 90b and 92a & 92b pivotably mounted to the spine member 80 via a pair of mounting plates 94 and 96. Substantially all other configurations and connections shown in FIG. 19 remain the same in FIG. 28.

Figure 29:
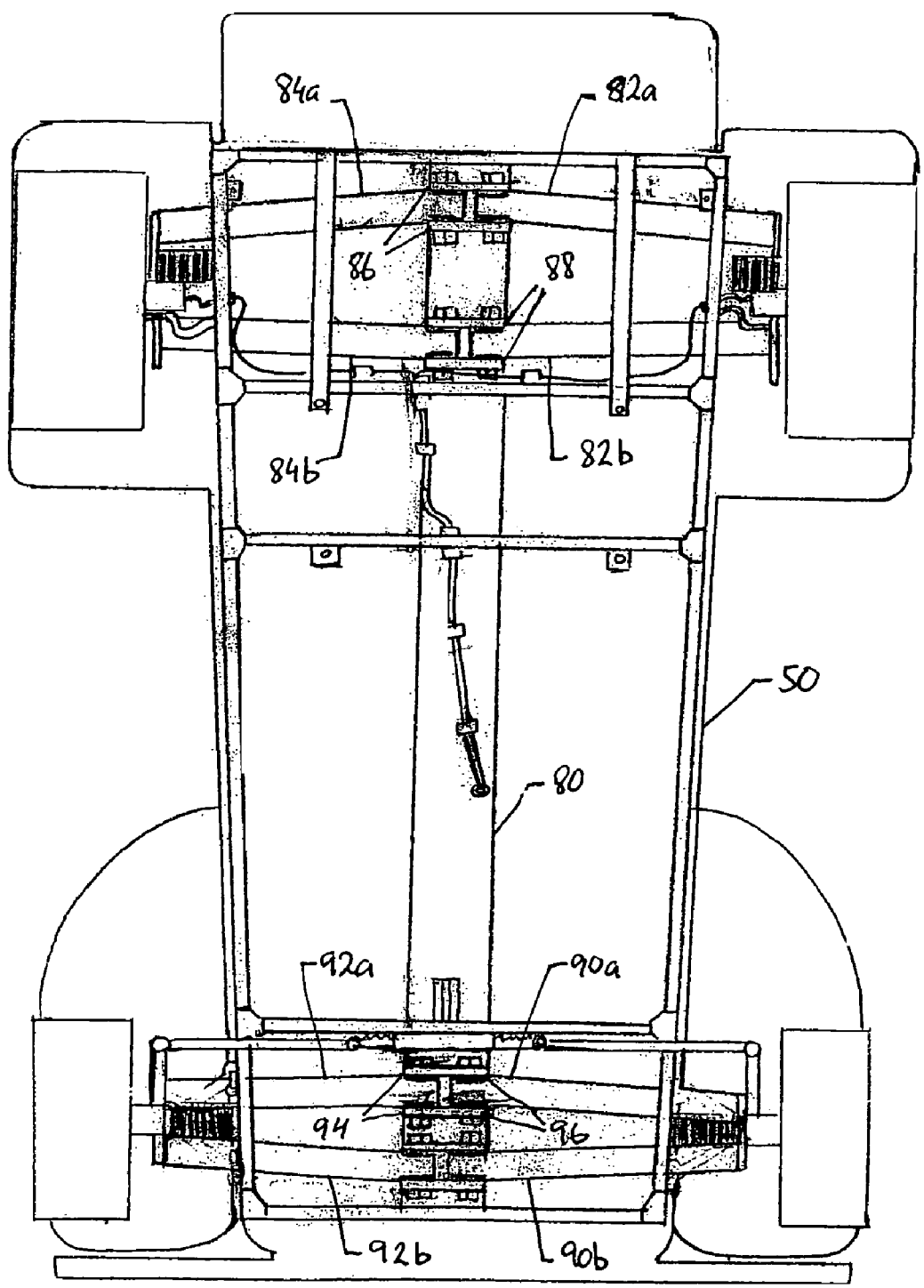
FIG. 29 is a bottom perspective view of the four-wheel electric wheel-driven vehicle of FIG. 3 with a spine member and alternative wheel support assembly.
Figure 30:
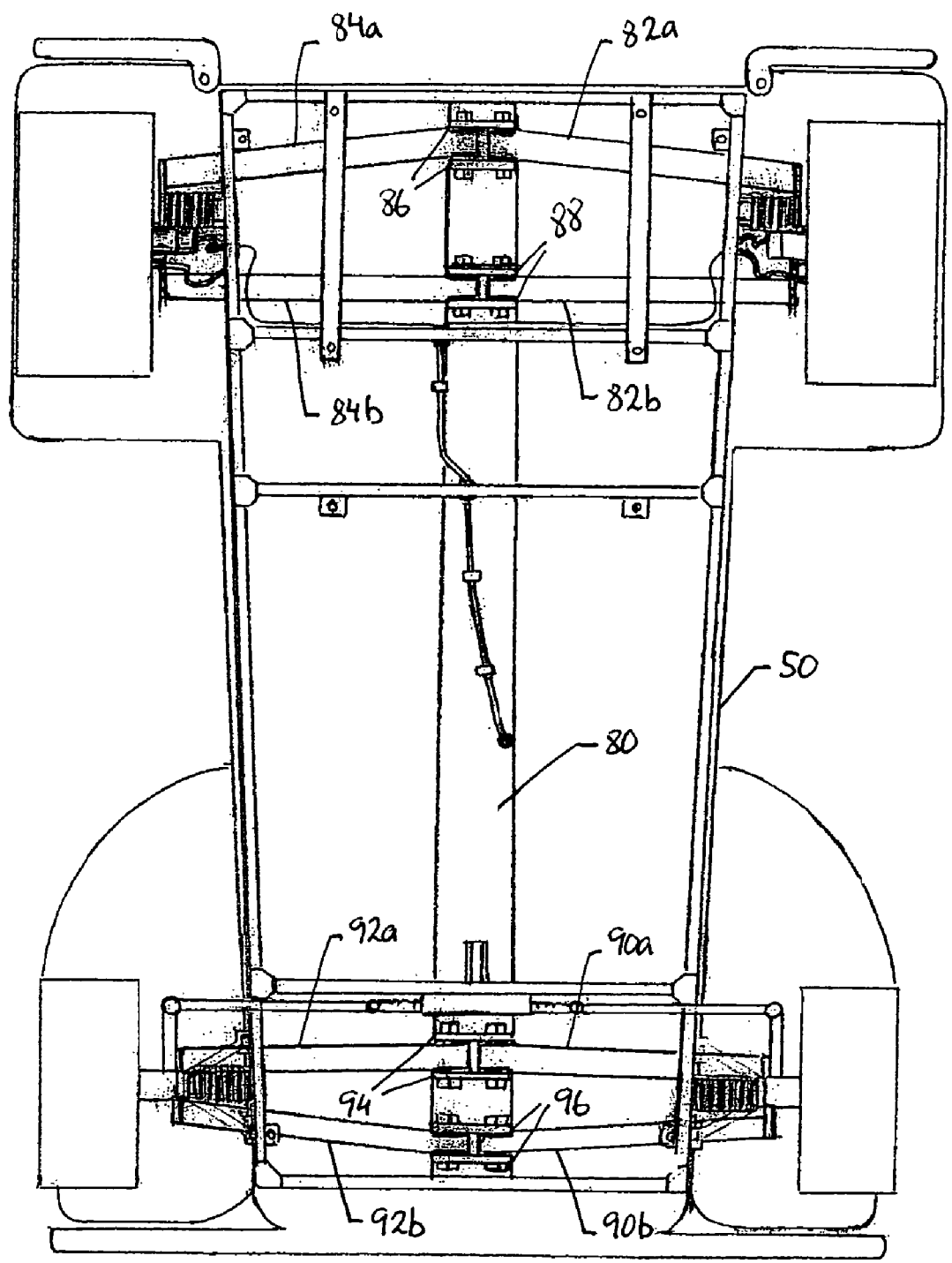
FIG. 30 is a bottom perspective view of the four-wheel electric wheel-driven vehicle of FIG. 4 with a spine member and alternative wheel support assembly.

FIGS. 29 and 30 are substantially similar to FIGS. 20 and 21 with the exception that the spine member 80, rear wheel support members 82a & 82b and 84a & 84b, mounting plates 86 and 88, front wheel support members 90a & 90b and 92a & 92b, and mounting plates 94 and 96 have replaced the rear wheel suspension assembly 58 and front wheel suspension assembly 49.

Figure 31:
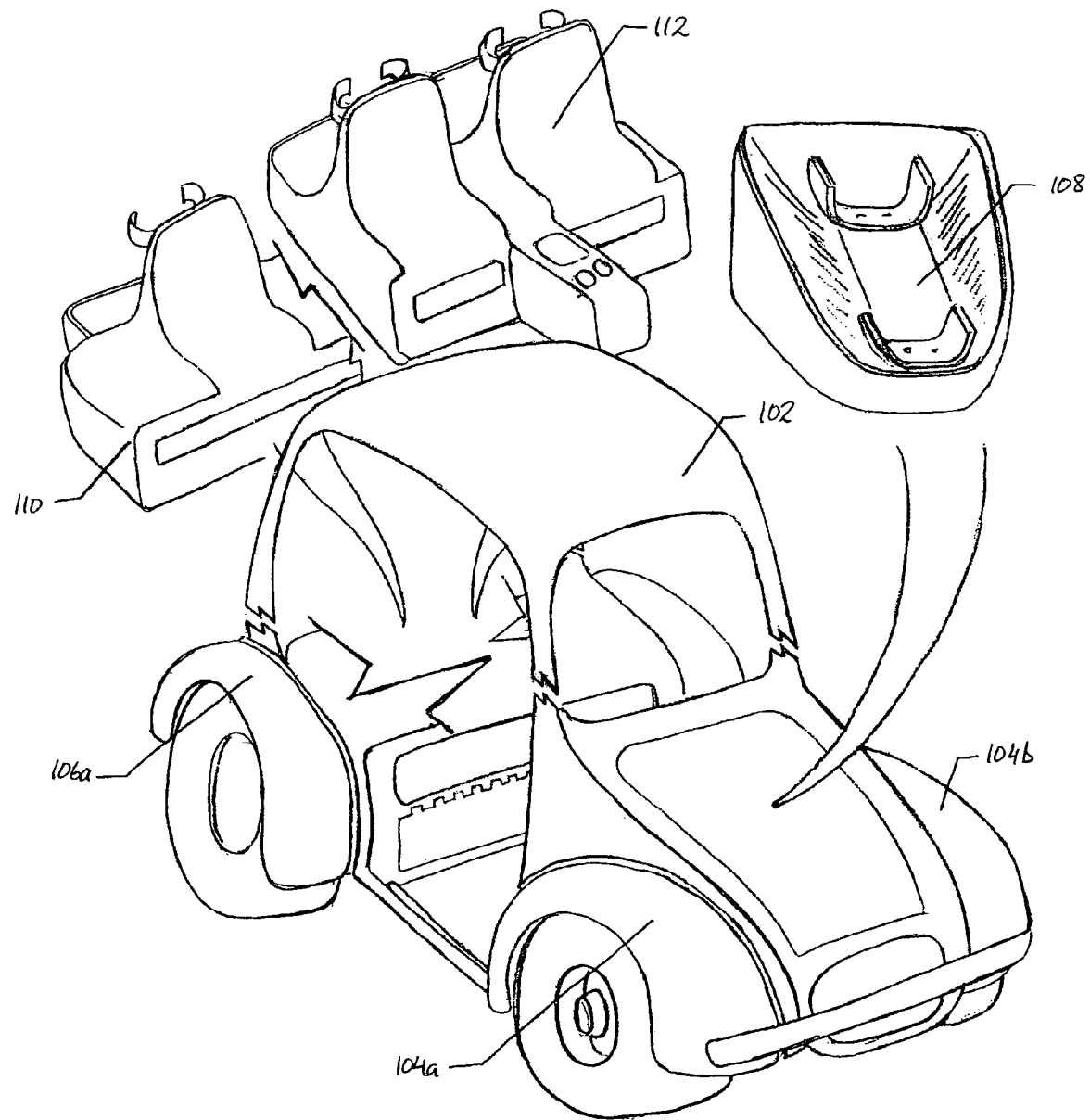
FIG. 31 is a perspective view of a four-wheel electric wheel-driven vehicle having releasably attached body panels that may be adapted for different applications.

FIG. 31 is a perspective view of a four-wheel electric wheel-driven vehicle having releasably attached body panels that may be adapted for different applications. These modular body panels may be releasably attached and swapped in and out to configure the vehicle as needed. For example, in some embodiments, the releasably attached modular body panels include the roof panel 100 to, front fender panels 104a and 104b, and rear fender panels 106a and 106b. In addition, the nose of the vehicle is adapted to receive a modular storage section 108, such as a golf bag or a multi-purpose utility storage section 108. The single-seat 110 selections as well as two-seat sections 112 are also available. These various modular components may be releasably mounted to the vehicle and to each other using any technique known to those having ordinary skill in the art.

Figures 32A, 32B, 32C, 32D, 32E, 32F, 32G:
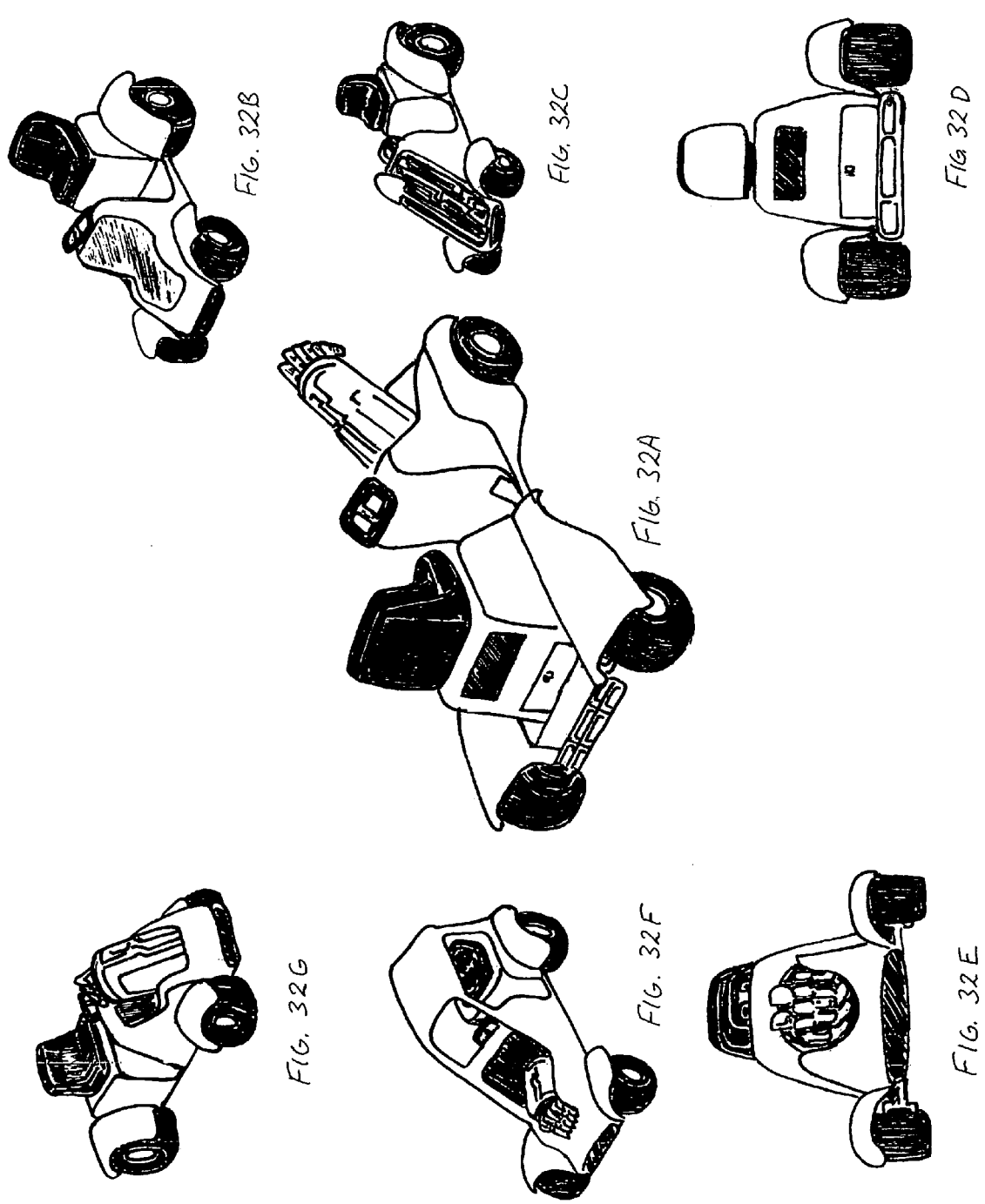
FIGS. 32A-32G are various views of different types of four-wheel electric wheel-driven vehicles according to embodiments of the invention.

FIGS. 32A-32G are various views of different embodiments of the four-wheel, electric, wheel-driven vehicle that may be implemented using the concepts and principles discussed herein according to embodiments of the invention. For example, FIGS. 32A, 32B, and 32E show various views of a single-seat golf cart. FIGS. 32C and 32D show various views of a single-seat utility cart. The term "utility cart" as used herein refers to a general-purpose vehicle that is capable of multiple functions, including transporting people, tools, cargo, and the like. It is contemplated that such a utility vehicle will be used primarily for off-road (or unpaved road) applications, but it may certainly be used on paved roads as well. FIG. 32F shows a covered version of a single-seat golf cart, whereas FIG. 32G shows an ADA (Americans with Disabilities Act) version of the single-seat utility the cart.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A battery powered four-wheeled vehicle, comprising:
a longitudinal frame member;
a body mounted to the frame member, wherein the body comprises one or more releasably attached panels that may be exchanged in order to reconfigure the vehicle, wherein the panels include at least one golf cart panel and at least one utility vehicle panel, wherein the vehicle may be selectively reconfigured as either a golf cart, using the golf cart panel, or a utility vehicle, using the utility vehicle panel, and wherein the golf cart panel and the utility vehicle panel are interchangeable, and wherein the panels include a single-seat section and a two-seat section;
a pair of front suspension assemblies attached to the frame member;
a pair of rear suspension assemblies attached to the frame member; and
a battery operated hub motor mounted on at least one of the suspension assemblies and configured to directly drive a wheel.

2. The vehicle according to claim 1, wherein the panels include at least one single-seat golf cart panel, at least one dual-seat golf cart panel, at least one single-seat utility vehicle panel, and at least one dual-seat utility vehicle panel.

3. The vehicle according to claim 2, wherein the vehicle may be selectively reconfigured as either a single-seat golf cart, using the single-seat golf cart panel, a dual-seat golf cart, using the dual-seat golf cart panel, a single-seat utility vehicle, using the single-seat utility vehicle panel, or a dual-seat utility vehicle, using the dual-seat utility vehicle panel.

4. The vehicle according to claim 1, wherein the panels include a roof panel, a front fender panel, and a rear fender panel.

5. The vehicle according to claim 1, wherein the panels include a storage section.

6. The vehicle according to claim 5, wherein the storage section is a golf bag storage section.

7. The vehicle according to claim 5, wherein the storage section is an all-purpose utility storage section.

8. The vehicle according to claim 1, wherein the vehicle requires no differential gears or drive axles to rotate the wheel.

9. The vehicle according to claim 1, wherein the frame member is a single spine extending longitudinally down the middle of the vehicle.

10. The vehicle according to claim 1, wherein the suspension assemblies are mounted directly to the frame member.

11. The vehicle according to claim 1, wherein the vehicle may be selectively reconfigured as either a single-seat vehicle, using the single-seat section, or a dual-seat vehicle, using the dual-seat section, and wherein the single-seat section and the dual-seat section are interchangeable.

12. The vehicle according to claim 1, wherein the motor may be interchangeably mounted on any one of the wheels without modification to the motor or the wheels.

13. A battery powered four-wheeled vehicle, comprising:
a central spine longitudinal frame member;
a body mounted to the frame member, wherein the body comprises a plurality of releasably attached panels that may be exchanged in order to reconfigure the vehicle, wherein the panels include a roof panel, a front fender panel, a rear fender panel, a golf bag storage section, a utility storage section, a single-seat section, and a dual-seat section;
a pair of front suspension assemblies attached to the frame member, each front suspension assembly attached on opposing sides of the frame member;
a pair of rear suspension assemblies attached to the frame member, each rear suspension assembly attached on opposing sides of the frame member; and
a battery operated hub motor mounted on at least one of the suspension assemblies and configured to directly drive a wheel, wherein the vehicle requires no differential gears or drive axles to rotate the wheel.

14. The vehicle according to claim 13, wherein the golf bag storage section is interchangeable with the utility storage section and the single-seat section is interchangeable with the dual-seat section.

15. A battery powered four-wheeled vehicle, comprising:
a single central spine longitudinal frame member;
a body mounted to the frame member, wherein the body comprises a plurality of releasably attached panels that may be exchanged in order to reconfigure the vehicle, wherein the panels include at least one single-seat golf cart panel, at least one dual-seat golf cart panel, at least one single-seat utility vehicle panel, and at least one dual-seat utility vehicle panel;

a pair of front suspension assemblies attached directly to the frame member, each front suspension assembly attached on opposing sides of the frame member;

a pair of rear suspension assemblies attached directly to the frame member, each rear suspension assembly attached on opposing sides of the frame member; and a battery operated hub motor mounted on at least one of the suspension assemblies and configured to directly drive any one of two rear wheels, wherein the motor may be interchangeably mounted on either one of the rear wheels without modification to the motor or the wheels.

16. A battery powered four-wheeled vehicle, comprising:

a longitudinal frame member;

a body mounted to the frame member, wherein the body comprises one or more releasably attached panels that may be exchanged in order to reconfigure the vehicle, wherein the panels include a single-seat section and a two-seat section;

a pair of front suspension assemblies attached to the frame member;

a pair of rear suspension assemblies attached to the frame member; and a battery operated hub motor mounted on at least one of the suspension assemblies and configured to directly drive a wheel.

17. The vehicle according to claim 16, wherein the panels include at least one golf cart panel.

18. The vehicle according to claim 16, wherein the panels include at least one utility vehicle panel.

19. The vehicle according to claim 16, wherein the panels include at least one single-seat golf cart panel, at least one dual-seat golf cart panel, at least one single-seat utility vehicle panel, and at least one dual-seat utility vehicle panel.

20. The vehicle according to claim 19, wherein the vehicle may be selectively reconfigured as either a single-seat golf cart, using the single-seat golf cart panel, a dual-seat golf cart, using the dual-seat golf cart panel, a single-seat utility vehicle, using the single-seat utility vehicle panel, or a dual-seat utility vehicle, using the dual-seat utility vehicle panel.

21. The vehicle according to claim 16, wherein the panels include a roof panel, a front fender panel, and a rear fender panel.

22. The vehicle according to claim 16, wherein the panels include a storage section.

23. The vehicle according to claim 22, wherein the storage section is a golf bag storage section.

24. The vehicle according to claim 22, wherein the storage section is an all-purpose utility storage section.

25. The vehicle according to claim 16, wherein the vehicle requires no differential gears or drive axles to rotate the wheel.

26. The vehicle according to claim 16, wherein the frame member is a single spine extending longitudinally down the middle of the vehicle.

27. The vehicle according to claim 16, wherein the suspension assemblies are mounted directly to the frame member.

28. The vehicle according to claim 16, wherein the vehicle may be selectively reconfigured as either a single-seat vehicle, using the single-seat section, or a dual-seat vehicle, using the dual-seat section, and wherein the single-seat section and the dual-seat section are interchangeable.

29. The vehicle according to claim 16, wherein the motor may be interchangeably mounted on any one of the wheels without modification to the motor or the wheels.

30. A battery powered four-wheeled vehicle, comprising:

a longitudinal frame member;

a body mounted to the frame member, wherein the body comprises one or more releasably attached panels that may be exchanged in order to reconfigure the vehicle, wherein the panels include a roof panel, a front fender panel, and a rear fender panel;

a pair of front suspension assemblies attached to the frame member;

a pair of rear suspension assemblies attached to the frame member; and a battery operated hub motor mounted on at least one of the suspension assemblies and configured to directly drive a wheel.

31. The vehicle according to claim 30, wherein the panels include at least one golf cart panel.

32. The vehicle according to claim 30, wherein the panels include at least one utility vehicle panel.

33. The vehicle according to claim 30, wherein the panels include at least one single-seat golf cart panel, at least one dual-seat golf cart panel, at least one single-seat utility vehicle panel, and at least one dual-seat utility vehicle panel.

34. The vehicle according to claim 33, wherein the vehicle may be selectively reconfigured as either a single-seat golf cart, using the single-seat golf cart panel, a dual-seat golf cart, using the dual-seat golf cart panel, a single-seat utility vehicle, using the single-seat utility vehicle panel, or a dual-seat utility vehicle, using the dual-seat utility vehicle panel.

35. The vehicle according to claim 30, wherein the panels include a storage section.

36. The vehicle according to claim 35, wherein the storage section is a golf bag storage section.

37. The vehicle according to claim 35, wherein the storage section is an all-purpose utility storage section.

38. The vehicle according to claim 30, wherein the vehicle requires no differential gears or drive axles to rotate the wheel.

39. The vehicle according to claim 30, wherein the frame member is a single spine extending longitudinally down the middle of the vehicle.

40. The vehicle according to claim 30, wherein the suspension assemblies are mounted directly to the frame member.

41. The vehicle according to claim 30, wherein the motor may be interchangeably mounted on any one of the wheels without modification to the motor or the wheels.

42. A battery powered four-wheeled vehicle, comprising:

a longitudinal frame member;

a body mounted to the frame member, wherein the body comprises one or more releasably attached panels that may be exchanged in order to reconfigure the vehicle, wherein the panels include a storage section, at least one single-seat golf cart panel, at least one dual-seat golf cart panel, at least one single-seat utility vehicle panel, and at least one dual-seat utility vehicle panel;

a pair of front suspension assemblies attached to the frame member;

a pair of rear suspension assemblies attached to the frame member; and a battery operated hub motor mounted on at least one of the suspension assemblies and configured to directly drive a wheel.

43. The vehicle according to claim 42, wherein the panels include at least one golf cart panel.

44. The vehicle according to claim 42, wherein the panels include at least one utility vehicle panel.

45. The vehicle according to claim 42, wherein the storage section is a golf bag storage section.

46. The vehicle according to claim 42, wherein the storage section is an all-purpose utility storage section.

47. The vehicle according to claim 42, wherein the vehicle requires no differential gears or drive axles to rotate the wheel.

48. The vehicle according to claim 42, wherein the frame member is a single spine extending longitudinally down the middle of the vehicle.

49. The vehicle according to claim 42, wherein the suspension assemblies are mounted directly to the frame member.

50. The vehicle according to claim 42, wherein the vehicle may be selectively reconfigured as either a single-seat golf cart, using the single-seat golf cart panel, a dual-seat golf cart, using the dual-seat golf cart panel, a single-seat utility vehicle, using the single-seat utility vehicle panel, or a dual-seat utility vehicle, using the dual-seat utility vehicle panel.

51. The vehicle according to claim 42, wherein the motor may be interchangeably mounted on any one of the wheels without modification to the motor or the wheels.

* * * * *